United States Patent [19]

Wong et al.

[11] Patent Number: 5,062,703
[45] Date of Patent: Nov. 5, 1991

[54] METHOD AND APPARATUS FOR MEASURING THE LENGTH OF, OR DISTANCES TO DISCONTINUITIES IN, AN OPTICAL TRANSMISSION MEDIUM

[75] Inventors: Roger W. Wong; Hugo Vifian, both of Santa Rosa; Michael G. Hart, Windsor, all of Calif.

[73] Assignee: Hewlett-Packard Company, Palo Alto, Calif.

[21] Appl. No.: 474,184

[22] Filed: Feb. 2, 1990

Related U.S. Application Data

[63] Continuation-in-part of Ser. No. 146,642, Jan. 21, 1988, abandoned.

[51] Int. Cl.⁵ ............................................. G01N 21/00
[52] U.S. Cl. ................................................... 356/73.1
[58] Field of Search ................. 356/73.1, 237; 342/542

[56] References Cited

U.S. PATENT DOCUMENTS 4,218,678 8/1980 Fowler et al. ........................ 342/542
4,921,347 5/1990 Wong et al. ......................... 356/73.1

OTHER PUBLICATIONS

"Frequency Domain Optical Reflectometer", MacDonald, Applied Optics, 5-1981, pp. 1840-1844.

Primary Examiner—Samuel Turner
Attorney, Agent, or Firm—William C. Milks, III

[57] ABSTRACT

A lightwave component measurement system provides modulation measurements and the use of digital signal processing for the resolution of single or multiple optical reflections in optical fiber cable or in open beam at discontinuities attributable to changes in the effective index of refraction in an optical transmission medium. The lightwave component measurement system preferably incorporates a transform capability that converts data measured in the modulation frequency domain to the time or distance domain. The time-domain data are both stable and accurate, since they are calculated from highly-stable, highly-precise frequency-domain information. The time-domain transform capability in the lightwave component measurement system allows a reflection to be located to millimeters, and resolution of multiple discontinuities just centimeters apart. This also enables precise measurement of the magnitude and distance to each discontinuity, as well as the length of an optical transmission medium, such as optical fiber cable. The lightwave component measurement system in accordance with the invention has a broad measurement dynamic range (typically 45 dB) with no measurement dead zones.

20 Claims, 12 Drawing Sheets

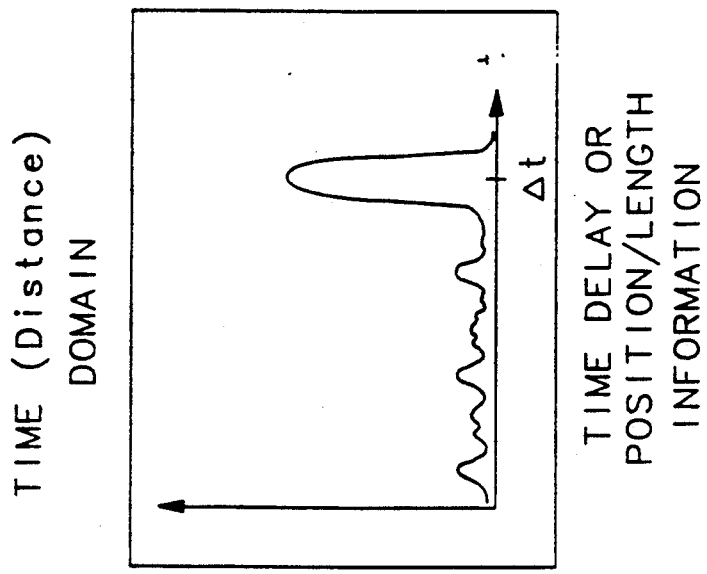
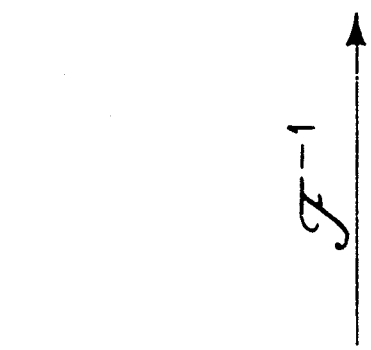
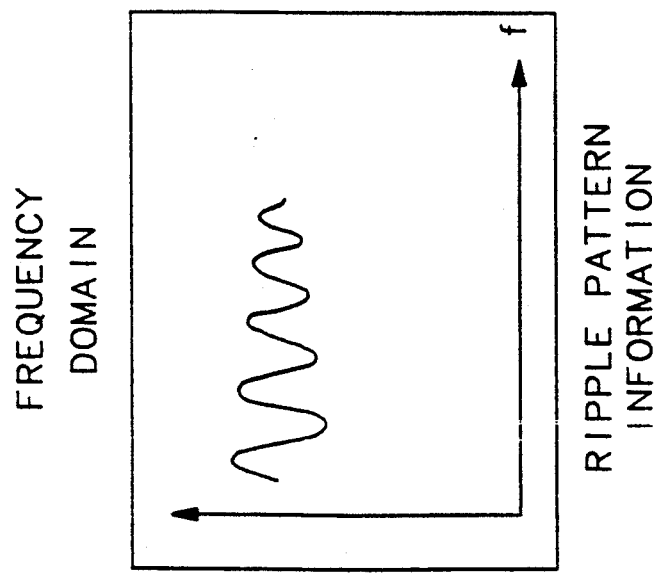
FIG 5B
FIG 5A

OPTICAL FREQUENCY DOMAIN REFLECTOMETRY

METHOD AND APPARATUS FOR MEASURING THE LENGTH OF, OR DISTANCES TO DISCONTINUITIES IN, AN OPTICAL TRANSMISSION MEDIUM

CROSS-REFERENCE TO RELATED APPLICATIONS

This patent application is a continuation-in-part of U.S. patent application Series Code/Ser. No. 07/146,642, entitled "Method and Apparatus For Locating Discontinuities In Optical Transmission Media," filed on Jan. 21, 1988, in the names of Roger W. Wong, Hugo Vifian, and Michael G. Hart now abandoned.

BACKGROUND OF THE INVENTION

This invention relates to electronic test and measurement instruments and, more particularly, to instrumentation for measuring characteristics of fiber optic systems, subsystems, and components. Specifically, the invention is directed to electronic measurement instruments for determining the continuity of elements in fiber optic systems, such as optical fiber cable.

Typical optical components of fiber optic systems include optical fiber cable and passive devices, such as switches, splitters, combiners, and attenuators. Various systems for measuring optical characteristics of these devices are known. The input and output signals for measurements on these devices are light, and the key parameters measured are attenuation versus modulation frequency, modulation bandwidth, optical delay, modal pulse dispersion, optical length, and distances to discontinuities. Discontinuities cause reflections in the optical component. Optical reflections and re-reflections produce standing wave patterns which create fading effects and crosstalk in optical communications systems.

Typically, discontinuities in fiber optic systems are located by a technique known as "optical-time-domain reflectometry" (OTDR). A measurement system which employs the OTDR technique is initially connected to the optical component to be tested. The next step of the OTDR technique is to generate a time domain optical pulse. This pulse is applied to the optical component being tested and is transmitted through the component until the terminus of the component is reached or until a discontinuity is encountered. A portion of the pulse is reflected at the termination or at any discontinuity in the optical component and propagates back to the measurement system. The measurement system then operates to sense the Raleigh back scatter to detect the reflected pulse energy.

Manufacturers of a few measurement systems which employ the OTDR technique claim to be able to resolve multiple reflections which are spaced at distances on the order of less than or equal to 5 cm. However, the measurement dynamic range of their equipment is limited. For example, although one manufacturer claims to resolve multiple reflections down to 1 mm spacing, the measurement dynamic range in terms of optical power is 30 dB.

Also, because the OTDR technique is employed to test long lengths of optical fiber cable and, also, because of inherent limitations on the amount of pulse energy which can be pumped into the cable, the measurement system typically has a high sensitivity so that remote discontinuities can be detected. Unfortunately, this results in "dead zones" where discontinuity measurements cannot be performed. These dead zones result when the pulse energy reflected from less remote discontinuities saturates the measurement system detector. Accordingly, it is desirable to avoid the dead zone problem inherent in the OTDR technique.

A known measurement system which avoids the limitations of measurement systems that employ the OTDR technique is shown in FIG. 1. Such a measurement system is disclosed, for example, in MacDonald, R. I., "Frequency domain optical reflectometers," *Applied Optics*, Vol. 20, No. 10, May 15, 1981, pages 1840–1844, and employs a Doppler frequency shift technique to detect one or more discontinuities in an optical fiber cable or to measure the length of the cable. The Doppler frequency shift measurement system disclosed in the MacDonald article comprises a fast swept modulation source connected through a power splitter to an electro-optical transducer to produce an intensity, or amplitude, modulated optical signal that is fed through an optical signal splitter/combiner to an optical fiber cable. The optical signal splitter/combiner produces a vectorial sum of the modulated optical signal incident on the optical fiber cable and any modulated optical signal reflected at a discontinuity or the terminus of the cable. The vectorial sum of the incident and reflected optical signals is converted to an electrical signal by an opto-electrical transducer. The electrical signal is then fed to a mixer where it is mixed with the modulation signal received from the power splitter, and the mixed product is fed to a spectrum analyzer which measures the frequency offset due to the travel time of the modulated reflected signal in the optical fiber cable. Unfortunately, the modulation frequency must be rapidly swept in order to generate a Doppler frequency shift. The rate at which such a modulation source can be swept, however, is limited by settling time of the circuit which produces the modulation signal.

SUMMARY OF THE INVENTION

In accordance with one embodiment of the invention, a lightwave component measurement system is provided for modulation measurements and digital signal processing to resolve single or multiple optical reflections in optical fiber cable or in open beam at discontinuities attributable to changes in the effective index of refraction in an optical transmission medium. The lightwave component measurement system measures the distance to a discontinuity in, or the length of, an optical fiber cable based on a static modulation envelope phase shift method to compute the propagation delay and employs a similar method using different modulation frequencies to separate multiple events attributable to different discontinuities in the cable and the terminus of the cable. Furthermore, the lightwave component measurement system preferably incorporates a transform capability that converts data measured in the modulation frequency domain to the time or distance domain so that the discontinuities and the termination of the optical fiber cable can be viewed on a display as a function of time or distance.

By detecting or demodulating the envelope of the incident and reflected optical signals, the location of discontinuities can be determined from the envelope phase shift between the incident and the reflected optical signals according to the expression $X = (Vc1/2) * \text{Delta Phiel}*m$. Also, the optical reflection coefficient is given by the amplitude ratio of the demodulated incident and reflected optical signals according to the expression $rho_{optical} = V_{rDem}/V_{iDem}$.

In the case where two or more reflections are present, a different envelope phase shift will occur for each of the reflected signals at a second (different) modulation frequency. Therefore, the distance to each reflection can be computed based on the envelope phase shift difference at two discrete modulation frequencies, without having to sweep the modulation frequency at a high rate as required by the Doppler frequency shift technique described in the aforementioned MacDonald article.

Preferably, time or distance domain data are computed from the modulation frequency domain information. These time or distance domain data are both stable and accurate, since they are calculated from highly-stable, highly-precise modulation frequency domain information. Accordingly, one embodiment of the lightwave component measurement system in accordance with the invention provides an optical reflection measurement capability which allows the resolution of multiple reflections which are closely spaced. The time domain transform capability in the lightwave component measurement system allows a reflection to be located to millimeters, and resolution of multiple discontinuities just centimeters apart, that is, a multiple reflection resolution capability of 5 cm. This also enables precise measurement of optical fiber cable length.

The lightwave component measurement system in accordance with the invention has a greater dynamic range than typical measurement systems which employ the OTDR technique. The lightwave component measurement system in accordance with the invention has a broad measurement dynamic range of typically 45 dB. Advantageously, the measurements are also free from the dead zones of traditional OTDR techniques.

Furthermore, although the configuration of the Doppler frequency shift measurement system disclosed in the MacDonald article and the configuration of various embodiments of the invention are similar, the modulation frequency of the lightwave component measurement system in accordance with the invention does not have to be rapidly swept in order to generate a Doppler frequency shift. Instead, the lightwave component measurement system in accordance with the invention is based on a static modulation envelope phase shift method to compute the propagation delay and the utilization of different modulation frequencies to separate multiple events.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

FIG. 5, comprising FIGS. 5A and 5B, illustrates transformation from modulation frequency domain information to time or distance domain data associated with the discontinuity location and length measurement method in accordance with the invention;

FIG. 7, comprising

DETAILED DESCRIPTION OF THE PREFERRED EMBODIMENTS

The invention generally relates to a method and apparatus for modulation measurements and the use of digital signal processing for the resolution of single or multiple optical reflections in optical fiber cable or in open beam at discontinuities attributable to changes in the effective index of refraction in an optical transmission medium based on the modulation measurements. The theory of operation for locating one or more discontinuities and/or measuring the length of optical fiber components will be described in detail below. Initially, however, various configurations for a lightwave component measurement system in accordance with the invention for performing the needed modulation measurements will be described.

Figure 1:
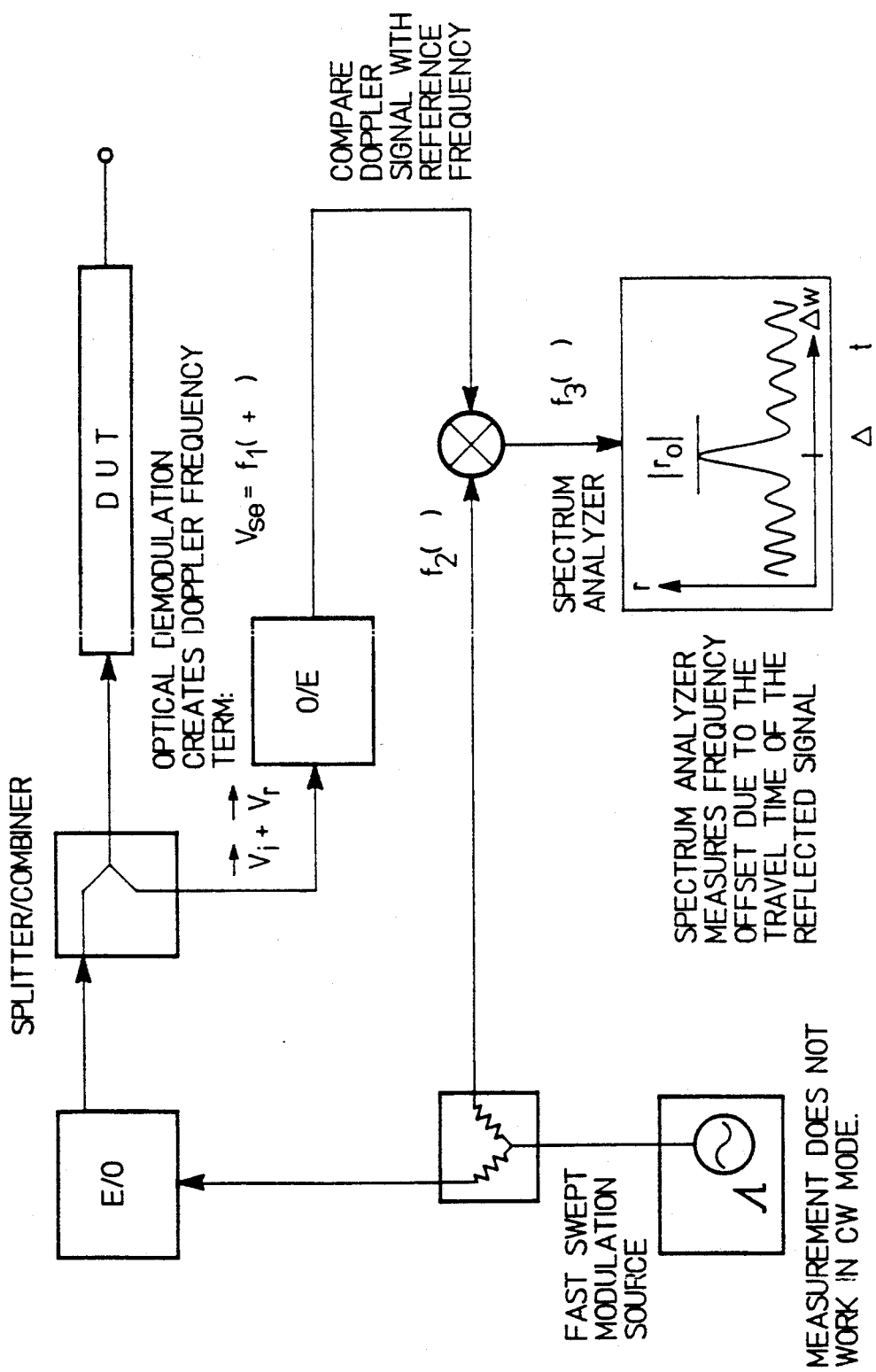
FIG. 1 is a block diagram of a known Doppler frequency shift measurement system which has a similar configuration to the lightwave component measurement system in accordance with various embodiments of the invention, but is fundamentally different in operation and limited to fast swept modulation to perform measurements.
Figure 2:
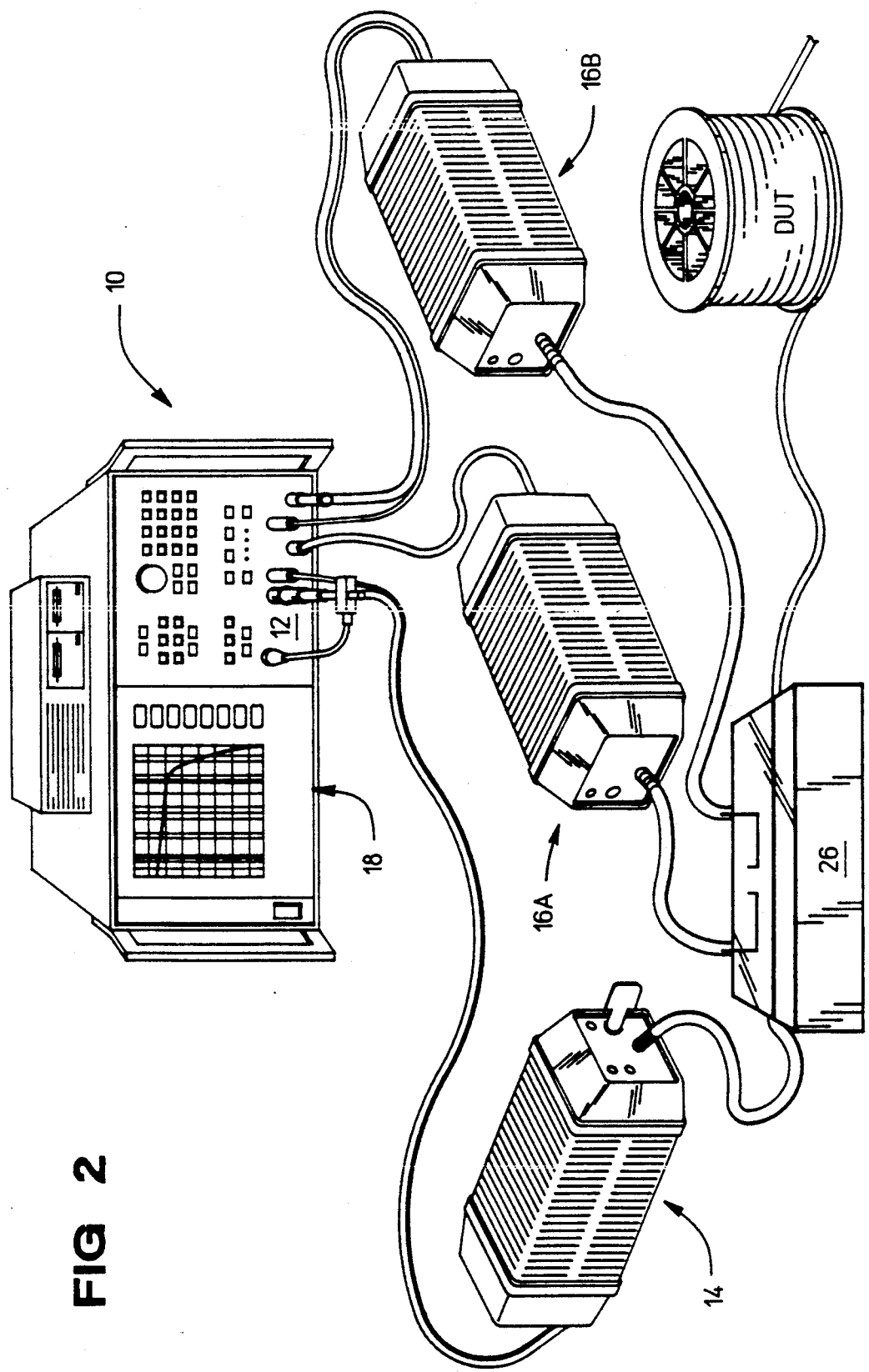
FIG. 2 is an isometric view of a lightwave component measurement system incorporating optical transmission medium discontinuity location and length measurement in accordance with one embodiment of the invention.

FIG. 2 shows a lightwave component measurement system in accordance with one embodiment of the invention, generally indicated by the numeral 10. Its principal elements are a lightwave component analyzer 12, a lightwave source 14, and one or more lightwave receivers 16A and 16B. All of the elements of the lightwave component measurement system 10, including the performance of the lightwave source 14 and the performance of the lightwave receivers 16A and 16B, are extensively characterized to achieve high levels of precision in lightwave measurements. FIG. 2 also shows a device under test (DUT), for example, a spool of optical fiber cable, connected to a directional optical coupler 26 associated with the lightwave component measurement system 10 in accordance with one embodiment of the invention for measurement of the optical characteristics of the DUT.

The lightwave component analyzer 12 preferably provides a modulation signal source which preferably generates a high-stability, 1 Hz-resolution synthesized signal that can be swept from 300 kHz to 3 GHz. The lightwave component analyzer 12 preferably comprises essentially a 3 GHz vector network analyzer, for example, an HP 8753 Vector network analyzer available from Hewlett-Packard Company, Network Measurements Division, Santa Rosa, Calif., specifically modified for lightwave measurements. It provides a 300 kHz to 3 GHz electrical signal used to intensity, or amplitude, modulate either a single-mode or multi-mode lightwave source 14 preferably operating at a given optical carrier frequency, such as a diode laser which produces a continuous wave optical signal having a wavelength of 1300 nm.

The electro-optical characteristics of the lightwave source 14 and the opto-electrical characteristics of the lightwave receivers 16A and 16B in a test setup have to be sensitive, stable, and repeatable. Also, their modulation and demodulation bandwidths need to be wider than that of the DUT. The lightwave source 14 and the lightwave receivers 16A and 16B preferably have the following performance characteristics.

The lightwave source 14 can be a single-mode or multi-mode optical signal source, or transmitter, which incorporates stable laser diodes as 1300 nm light sources with narrow, clean spectra. Modulation bandwidth of the lightwave source 14 is 3 GHz, with better than $+/-3.0$ dB flatness. This can be significantly improved when optical measurement calibration techniques preferably incorporated into the lightwave component analyzer 12 are used. The optical dynamic range of the lightwave source 14 is typically 40 dB or more. The intensity-modulated optical signal from the lightwave source 14 is applied to the DUT when optical characteristics of the DUT are measured.

The lightwave receivers 16A and 16B are high-stability, high-resolution precision optical signal receivers with 100 dB dynamic range which allow measurements over a wide dynamic range and enable the lightwave component measurement system 10 to operate with an optical sensitivity of $-40$ dBm. The lightwave receivers 16A and 16B operate with both single-mode and multi-mode optical fiber cables. Their optical detectors are preferably a PIN photodiode. The lightwave receivers 16A and 16B have a modulation bandwidth that preferably extends to 3 GHz with $+/-4$ dB flatness to 2 GHz, rolling off to $-14$ dB at 3 GHz. As in the case of the lightwave source 14, the flatness of the lightwave receivers 16A and 16B is also improved significantly when the optical measurement calibration techniques incorporated into the lightwave component analyzer 12 are used. Minimum detectable optical signal (for modulations that extend to 2 GHz) is $-40$ dBm, and the typical optical dynamic range exceeds 40 dB. The 3 GHz modulation bandwidths of the lightwave source 14 and the lightwave receivers 16A and 16B provide ample margin for typical measurements.

The lightwave receivers 16A and 16B demodulate the received modulated optical signal for digital signal processing in the lightwave component analyzer 12. The transmission and reflection characteristics of the DUT are then displayed, preferably on a cathode ray tube (CRT) 18 preferably incorporated into the lightwave component analyzer 12. The transmission and reflection data for the DUT can be displayed either as a function of the modulation frequency or as a function of power, time, or distance.

The lightwave component measurement system 10 measures modulation (demodulation) bandwidth, modulation (demodulation) transfer functions, loss, optical delay, pulse dispersion, and reflections of lightwave system components, such as modulators, demodulators, optical fiber cables, and fiber optic components, based on modulation measurements. For optical components (such as optical fiber cable, couplers, and connectors), the lightwave component measurement system 10 can measure such parameters as modulation bandwidth, optical insertion loss, pulse dispersion, optical reflections, and optical length. The lightwave component analyzer 12 has the following reflection measurement uncertainty:

| Magnitude | $+2.5$ dB |
|---|---|
|  | $-3.7$ dB |
| Dynamic range | 40 dB |

In accordance with one embodiment of the invention, single and multiple reflections can be resolved in time and distance with very high resolution. This enables precise location of one or more discontinuities and measurement of optical fiber cable length.

By detecting or demodulating the envelope of the incident and reflected signal, the location of discontinuities can be determined from the envelope phase shift between the incident and the reflected signal according to the expression $x=(c/2)*\text{DeltaPhi}_o/w_m$. The optical reflection coefficient is given by the amplitude ratio of the demodulated incident and reflected optical signals according to the expression $\text{rho}_{optical}=V_{rDem}/V_{iDem}$.

In the case where two or more reflections are present, a different envelope phase shift will occur for each of the reflected signals at a second (different) modulation frequency. It is therefore possible to compute the distance of each reflection based on the envelope phase shift difference at two discrete modulation frequencies, without having to sweep the modulation frequency at a high rate as required by the Doppler frequency shift technique.

By way of further explanation, when the modulation frequency is arbitrarily or monotonically changed, all of the various reflected optical signals in an optical transmission medium will trace a standing wave pattern as a function of the modulation frequencies. This ripple pattern enables unique determination of the various reflections in terms of magnitude and distance from the lightwave component measurement system 10. A computation can be performed to mathematically extract the ripple components from the standing wave pattern via a filtering algorithm, such as a Fourier transform, and then the reflections can be scaled versus distance according to their relative envelope phase shift given by the expression $x=(c/2)*\text{Delta Phi}_e/_m$.

Figure 3:
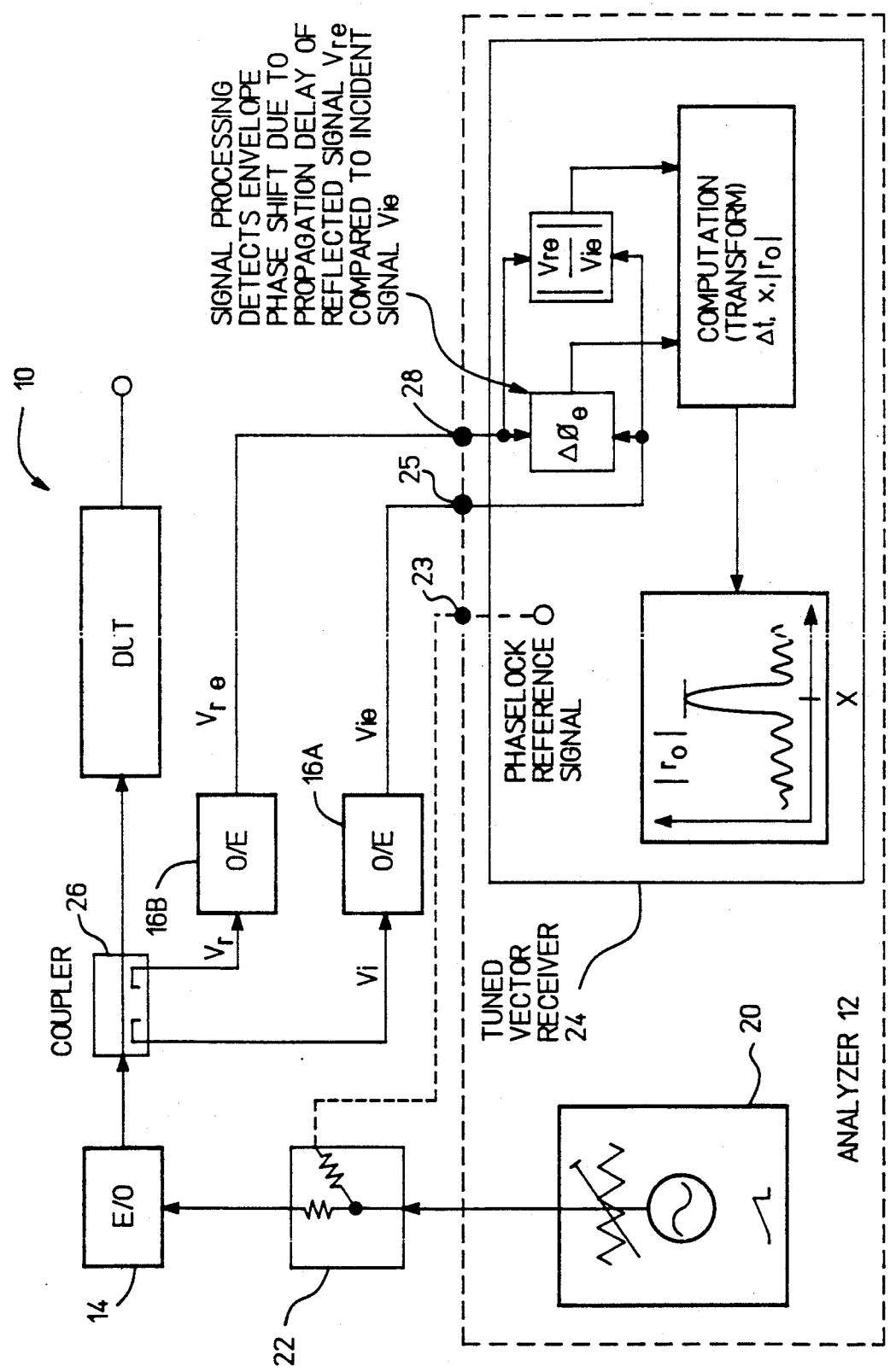
FIG. 3 is a block diagram of the lightwave component measurement system shown in FIG. 2 configured for measuring optical reflections to locate a discontinuity or to measure length.

FIG. 3 is a block diagram of one embodiment of the lightwave component measurement system 10 shown in FIG. 2 for measuring single and/or multiple optical reflections in an optical waveguide, such as optical fiber cable and/or in an open beam environment (DUT). Optical reflections are measured at any interface where there is a change in the index of refraction of the optical transmission medium. In accordance with the method of the invention, both the magnitude of and distance to the optical reflection(s) are measured. An optical mismatch can be measured by separating an incident test signal from a reflected one by means of a signal separation device, such as the optical signal coupler 26 shown in FIG. 3.

Considered in more detail, the embodiment of the lightwave component measurement system 10 shown in FIG. 3 for measuring optical reflections to locate a discontinuity or measure length comprises the lightwave component analyzer 12. The lightwave component analyzer 12 preferably incorporates a modulation source 20 which generates a 300 kHz to 3 GHz electrical signal. The electrical signal is input to a power splitter 22 which feeds a selected portion of the electrical signal generated by the modulation source 20 to an electro-optical (E/O) transducer in the form of the lightwave source 14. Another portion of the electrical signal generated by the modulation source 20 is fed as a reference signal to a first input port 23 of a tuned vector receiver 24 preferably incorporated into the lightwave component analyzer 12. It will be appreciated by persons skilled in the field of this invention, however, that the modulation source 20 and the tuned vector receiver 24 can be separate elements of the lightwave component measurement system 10.

The lightwave source 14 converts the electrical signal generated by the modulation source 20 to an intensity modulated optical signal. The modulated optical signal produced by the lightwave source 14 is input to the optical signal coupler 26 which couples a portion of the modulated optical signal produced by the lightwave source to an optical transmission medium (DUT) and another portion, correlated to the modulated optical signal incident on the DUT, to an opto-electrical (O/E) transducer in the form of the lightwave receiver 16A. The optical signal coupler 26 also couples a portion of the modulated optical signal produced by the lightwave source 14 that is reflected by the DUT to another opto-electrical transducer in the form of the lightwave receiver 16B.

The lightwave receivers 16A and 16B reconvert the respective reflected and incident modulated optical signals to respective electrical signals. The electrical signal produced by the lightwave receiver 16A is fed to a second input port 25 of the tuned vector receiver 24. The electrical signal produced by the lightwave receiver 16B is fed to a third input port 28 of the tuned vector receiver 24.

Figure 4:
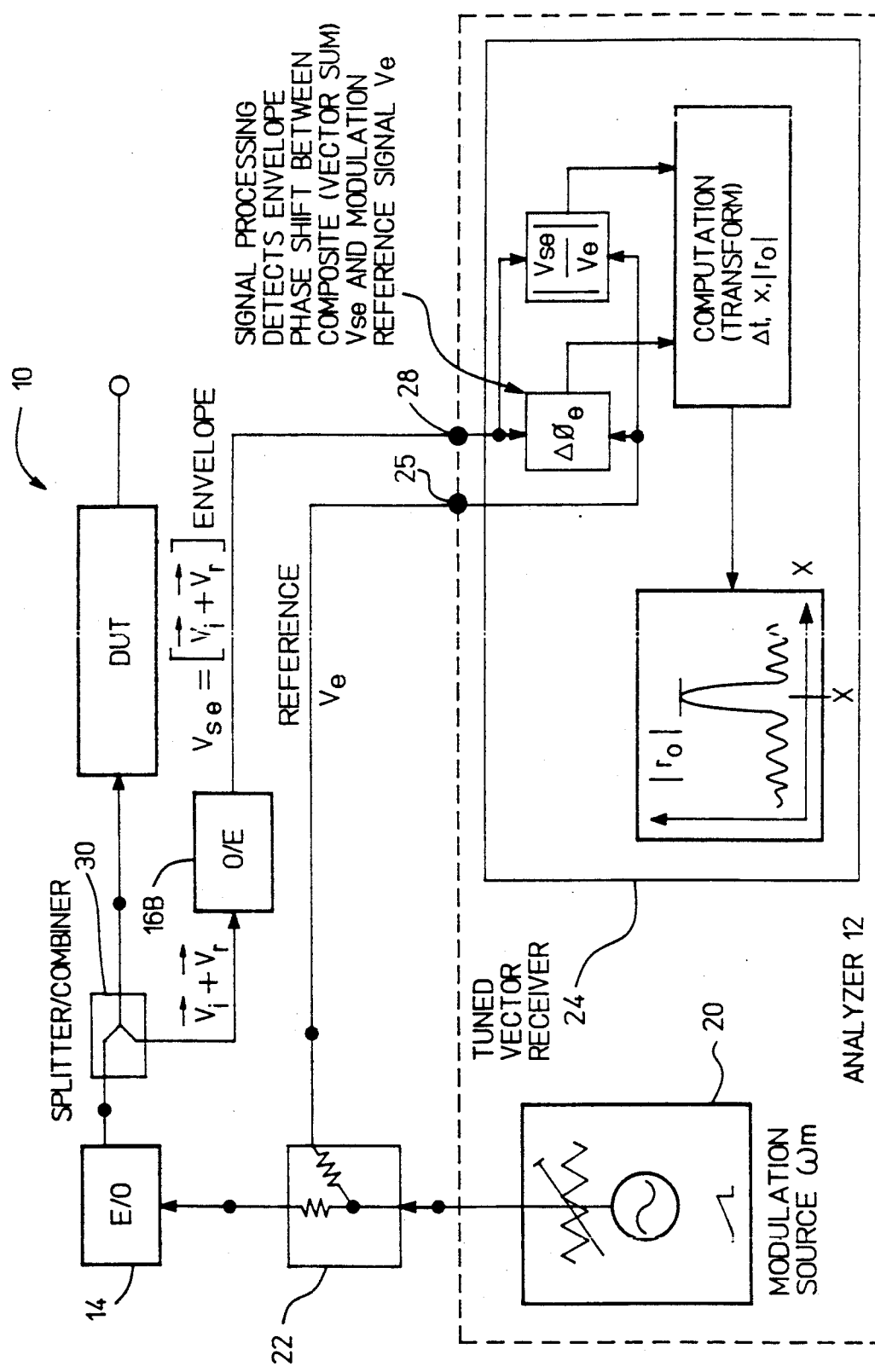
FIG. 4 is a block diagram of another embodiment of the lightwave component measurement system in accordance with the invention configured for measuring optical reflections to locate a discontinuity or to measure length.

It is also possible to demodulate the incident and reflected optical signals as a vector sum by not separating them, but rather tapping into the transmission line where the standing wave pattern has developed by means of a power splitter/combiner 30, as shown in FIG. 4. Again, the envelope phase shift of the vector sum will change when a different modulation frequency is applied, and the distance to a discontinuity or the terminus of the DUT can be calculated from the envelope phase shift as in the previous case.

Considered in more detail, FIG. 4 is a block diagram of another embodiment of the lightwave component measurement system 10. The embodiment of the lightwave component measurement system 10 shown in FIG. 4 is similar to that shown in FIG. 3 with the following differences. A portion of the electrical signal generated by the modulation source 20 is fed to the second input port 25 of the tuned vector receiver 24 as being representative of the electrical signal correlated to the modulated optical signal incident on the DUT, instead of providing a coupled signal to the lightwave receiver 16A and feeding the electrical signal produced by the lightwave receiver 16A to the second input port 25 as the electrical analog of the modulated optical signal incident on the DUT. Accordingly, the lightwave receiver 16A is eliminated. Finally, the splitter/combiner 30 is substituted for the optical signal coupler 26 and feeds a vectorial sum of the incident and reflected modulated optical signals to the lightwave receiver 16B, which the lightwave receiver in turn converts to an electrical signal that is fed to the third input port 28 of the tuned vector receiver 24.

The basic operation of the embodiments of the lightwave component measurement system 10 shown in FIGS. 3 and 4 is substantially the same. An optical signal separation device, such as the optical signal coupler 26 shown in FIG. 3 or the splitter/combiner 30 shown in FIG. 4, siphons off incident and reflected modulated optical signals. These incident and reflected modulated optical signals are then processed by the tuned vector receiver 24 to perform the modulation measurement. The lightwave component analyzer 12 then processes the frequency modulation domain information, as will be described shortly.

By way of further explanation, in the case of a specific spectral frequency component of an incident signal, the reflected signal becomes a phase-shifted replica of the incident frequency component scaled by a reflection coefficient. The incident and reflected signals add along the transmission line, and depending upon their relative phase relationship due to propagation delay in the transmission medium, reflections and re-reflections form standing wave patterns along the propagation path. The measured signal level is a function of the physical position where the measurement is performed.

The optical component measurement method in accordance with the invention employs at least one amplitude modulated optical signal of known amplitude, phase, carrier frequency, index of modulation, and modulation frequency. Assuming that the sideband spacing is narrow compared to the bandwidth of the optical component to be measured (this condition can always be met by reducing the modulation frequency), then the carrier signal and the sidebands are equally attenuated. Therefore, measuring the change in the signal envelope is a true measure of the carrier attenuation. Only an extremely high Q optical component could create an error. That is, for a $Q = 5 \times 10^9$, the error would be 3 dB.

Now, incident ($V_i$) and reflected ($V_r$), modulated optical signals are produced when a modulated optical signal is pumped into the optical transmission medium (DUT). These optical signals add vectorially to form an amplitude varying ripple pattern versus the modulation frequency.

The phase shift seen by the optical carrier signal is translated to the modulation envelope by the ratio of modulation frequency divided by the carrier frequency $W_c$. For example, a $2\pi$ carrier phase shift at 300 THz will only amount to a $2\pi \times 10^{-5}$ envelope phase shift, or $3.6 \times 10^{-3}$ degrees at a 3 GHz modulation frequency $w_m$.

Figure 10:
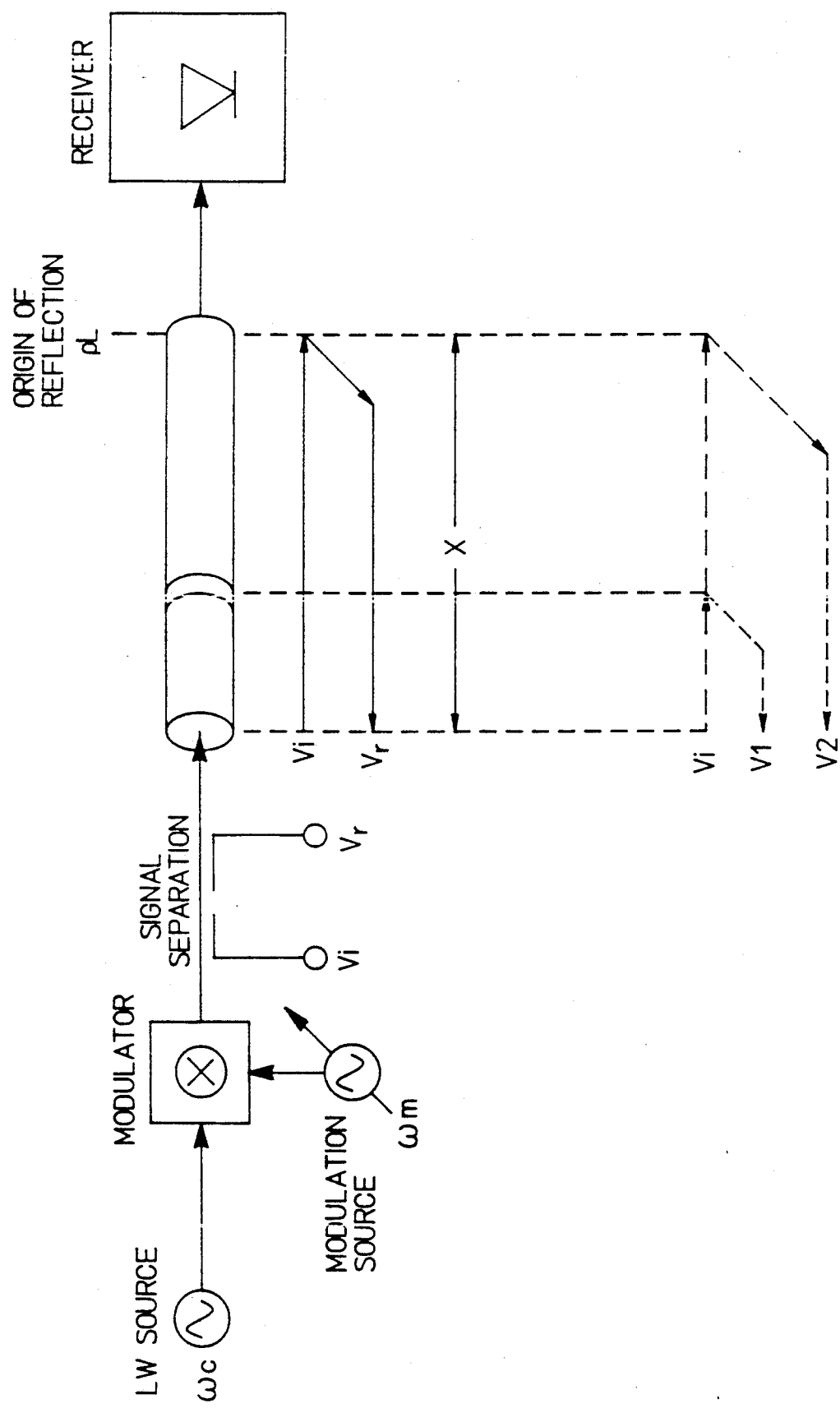
FIGS. 10 and 10a illustrate the envelope phase shift of reflected optical signals.
Figure 10A:
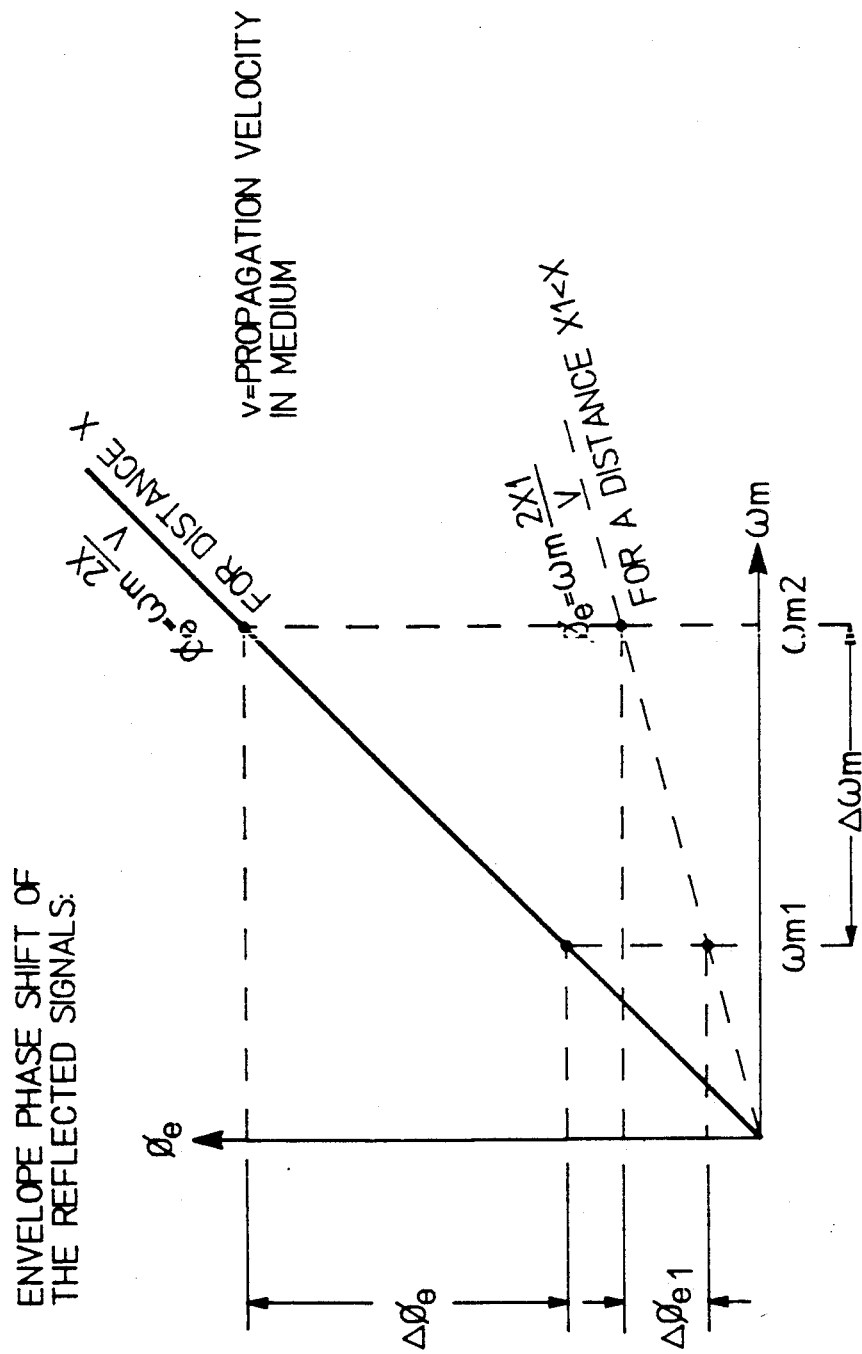

Considered in more detail, the ratio of the reflected optical signal to the incident optical signal yields the reflection coefficient magnitude at the optical carrier frequency $w_c$, which can be measured by an optical power meter. However, in accordance with the embodiments of the lightwave component measurement system shown in FIGS. 3 and 4, applying a modulated optical signal has the advantage that the origin of the reflected signal can be determined by computing the propagation delay and distance based on the envelope phase shift of the reflected test signal, as shown in FIG. 10. Furthermore, it is possible to apply the same method to multiple reflections, thus separating them in the distance or time domain.

Assume that a modulated optical signal of carrier frequency $w_c$ and modulation frequency $w_m$ travels from the optical source towards the end of a cleaved optical fiber cable. At the cleavage, the difference in the index of refraction will cause a Fresnel reflection to travel back toward the optical source and be separated from the incident signal. The reflected signal is an amplitude modulated signal proportional to the incident optical signal times the reflection coefficient (at the optical carrier frequency $w_c$) from which the reflection coefficient $|\Gamma(w_c)|$ can be calculated by comparing the reflected optical signal to the incident optical signal, as will be described later.

As the signal modulation frequency is changed, an amplitude ripple will be generated due to the rotation of the incident and reflected optical signal vectors, as shown in FIG. 10. The ripple amplitude is proportional to the reflection coefficient, and the ripple period is proportional to the distance between the mismatch and the physical position where the measurement is performed. Therefore, by measuring the frequency change (Delta w) it takes to go through a full cycle of $2\pi$ (or any other given phase shift), the location from the position where the measurement is performed to the location where the reflection is generated can then be calculated according to the following derivation.

If the incident modulated optical signal is:

$$V_i = sin\ (w \cdot t).$$

then the reflected modulated optical signal is:

$$V_r = rho\ sin(w(t + Delta\ t)).$$

From Delta $t = (2x/vel) = $ Delta $Phi_e/$Delta $w_m$, it follows that:

$$x = (vel/2) * Phi_e / w_m.$$

and for $Phi_e = 2\pi$, $$x = (vel/2)/f_m\ meters,$$

where x is the distance to the reflection and vel is the propagation velocity in the optical transmission medium.

FIG. 5A illustrates a conceptual example of the ripple pattern. The periodicity and amplitudes of each of the ripple components illustrated in FIG. 5A contain distance (length) and magnitude information with respect to discontinuities along, or the terminus of, the given optical transmission medium (DUT), an optical fiber cable, for example.

Figure 6:
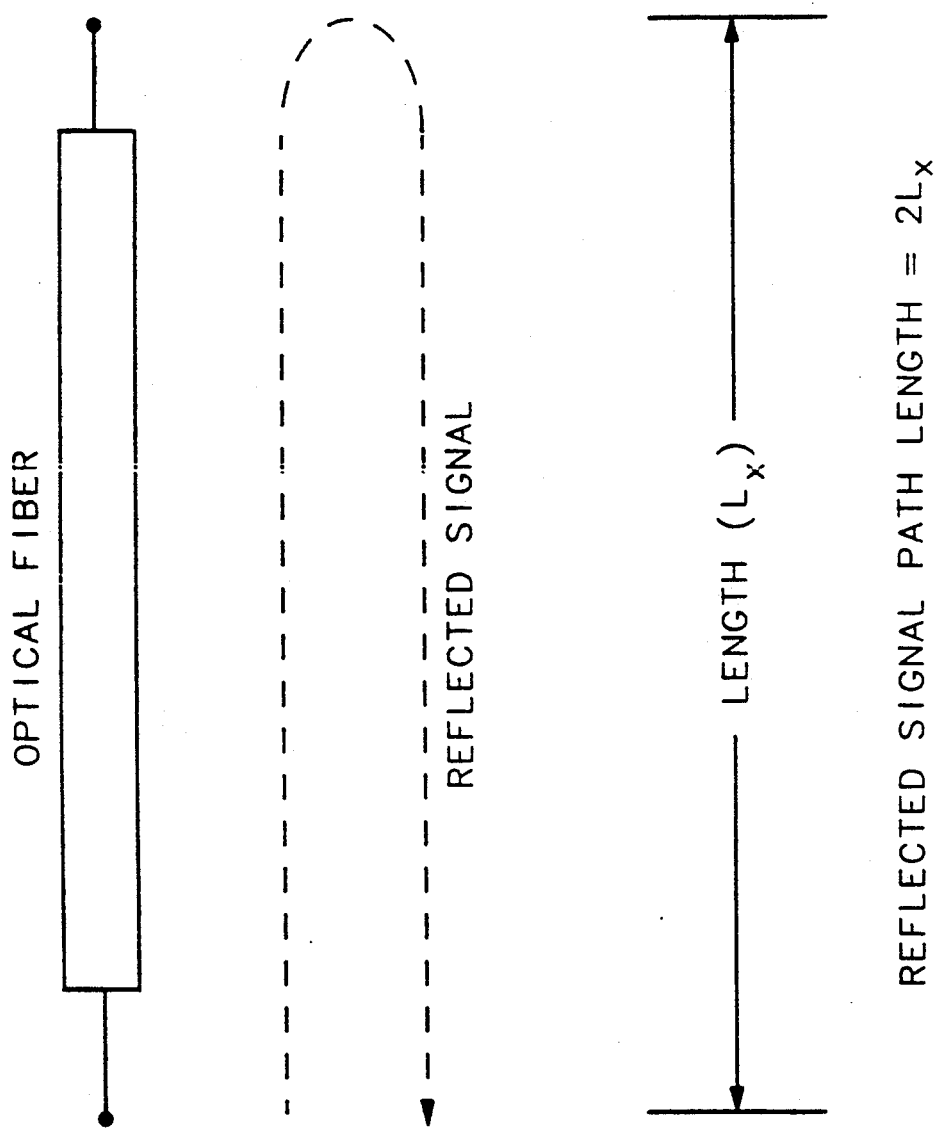
FIG. 6 is a diagram of a length of optical fiber cable to aid an explanation of one embodiment of the method in accordance with the invention for locating discontinuities in, and measuring the length of, an optical transmission medium.

FIG. 6 shows the method in accordance with the invention used to measure a given length of an optical fiber cable. The envelope phase shift of each reflection for a given modulation frequency corresponds to a time delay equal to twice the optical length of the optical fiber cable, i.e., $T =$ Delta $Phi_e/w_m = 2L_x * $ 1nsec/30cm. Accordingly, the optical length of the optical fiber cable is $L_x = c/2($Delta $Phi_e/w_m) = (\frac{1}{2})(30cm*T/1nsec)$.

Figure 7A:
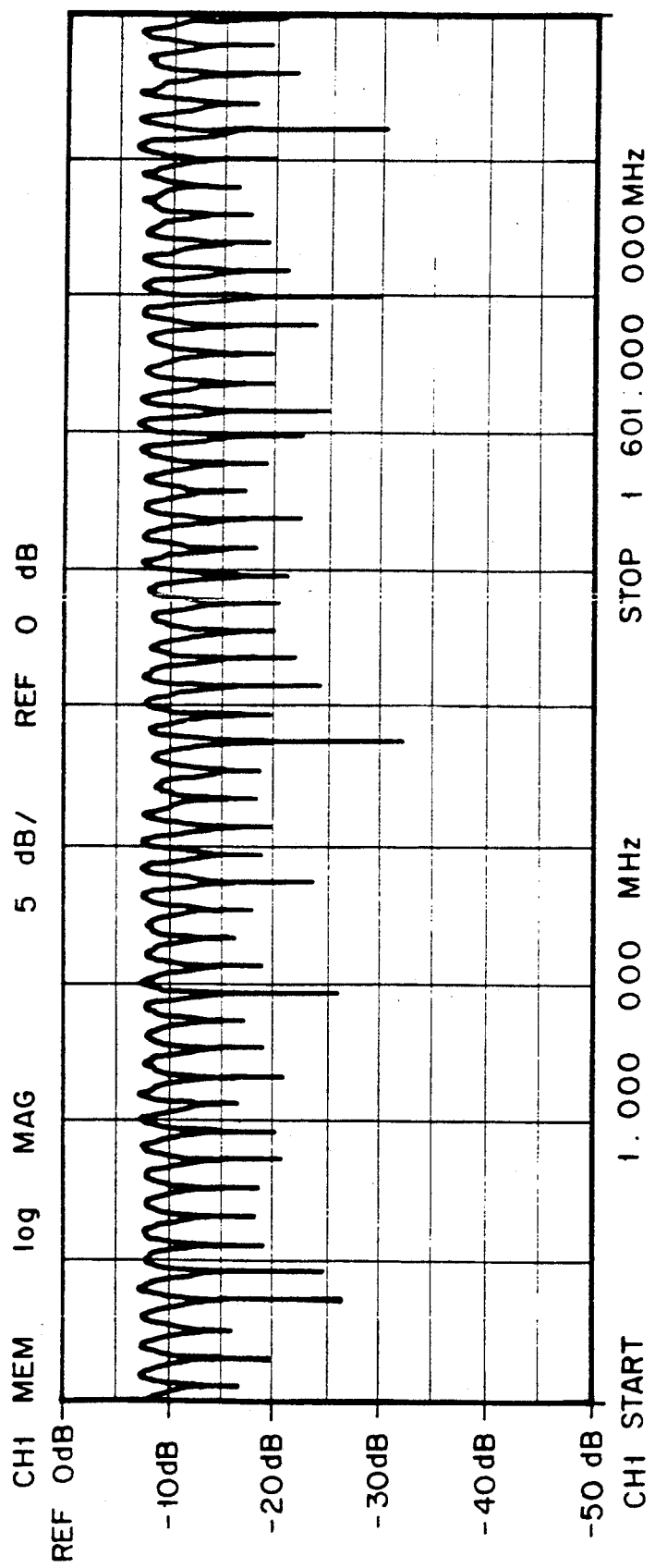
FIGS. 7A and 7B, illustrates an optical reflection measurement in accordance with the method of the invention for locating discontinuities and measuring length, in which return loss, in dB, is shown in the modulation frequency domain (FIG. 7A) and in the time domain (FIG. 7B)
Figure 7B:
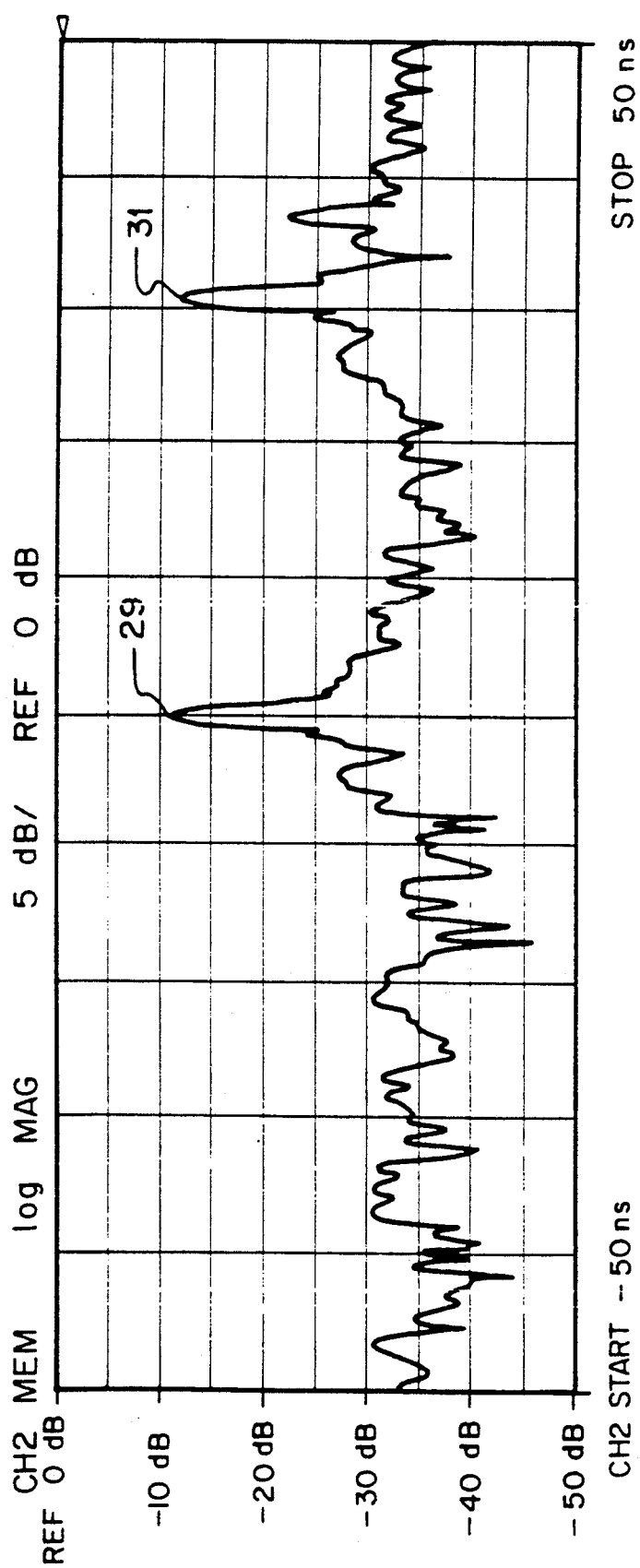

The distance(s) to one or more discontinuities is similarly measured. These discontinuities are resolved according to the expression $D_{Rf1} = (vel/2)[(Phi_{wm1}/w_{m1}) - (Phi_{wm2}/w_{m2})]$, $D_{Rf2} = (vel/2)[(Phi_{wm2}/w_{m2}) - (Phi_{wm3}/w_{m3})]$, etc. FIG. 7 illustrates an optical reflection measurement where return loss, in dB, is shown in the modulation frequency domain (FIG. 7A) and in the time or distance domain (FIG. 7B). As shown in FIG. 7B, two distinct reflections are easily resolved, as indicated by the events indicated by the numerals 29 and 31.

Therefore, since the reflected optical signal is a superposition of several signal components with different origins, each component will exhibit a different envelope phase shift proportional to the distance of the origin of the reflection from the measurement position and proportional to the modulation frequency $w_m$. Therefore, as the modulation frequency is changed, a ripple pattern is generated from which the amplitude of the reflection coefficient can be mathematically extracted, as well as the distance x to the origin of the reflection.

Furthermore, as shown in FIG. 10, it can be seen that the reflection coefficient will change for different modulation frequencies according to the delay equation $Phi_e = w_m t_o$ for a given delay $t_o$. Therefore, by measuring the envelope phase shift of the incident and reflected optical signals at two different modulation frequencies $w_{m1}$ and $w_{m2}$, the location of a reflection can be established according to the following derivation.

Let the modulated incident optical signal be:

$$V_i = [1 + alpha(t)]sin(w_c t).$$

Then, the modulated reflected optical signal is:

$$V_r = [1 + alpha(t + t_e)]sin[w_c(t + t_o)],$$

where:

$$t_e = (-)Phi_e/w_m$$

is the envelope delay and $$t_o = (-)Phi_c/w_c$$

is the carrier delay. Therefore, because:

$$w_m << w_c,\ t_e = t_o,$$

and the phase difference between $V_i$ and $V_r$ becomes:

$$Phi_e = w_m * t_o.$$

Accordingly, $$x = (vel/2)*Phi_e/w_m$$

is the location of $\Gamma$. Also, since x is constant, varying $w_m$ leads to a phase change proportional to the distance of the reflection:

$$Delta\ Phi_e = (2x/vel)*Delta\ w_m,$$

as earlier derived.

This not only enables measurement of the reflection coefficients, but with digital signal processing (in particular, digital convolutions and Fourier transforms) a determination can be made where the reflections occur and to separate multiple reflections from each other and to display them versus distance or time. With reference to FIG. 5, by performing a Fourier analysis on the demodulated envelope amplitude and phase information, the location of each reflection (i.e., discontinuity or length) is revealed, as shown in FIG. 5B.

Preferably, with digital signal processing, it is also possible to mathematically remove undesirable reflections from the desired response by a gating process. Gating provides the ability to mathematically select or reject certain Fourier components from the ripple pattern.

For a length measurement, the reflected optical signal is detected, and the minimum time (or distance) resolution of the measurement is given by the reciprocal of the maximum modulation frequency span (mf span) in GHz. The reflected signal path length is $2*L_x$, as shown in FIG. 6. Therefore, the minimum free space length, $L_x$, (index of refraction, n=1) that the method in accordance with the invention can theoretically resolve is $(\frac{1}{2}n)(1/\text{mf span-GHz})(30\text{cm/nsec})$.

In order to estimate the maximum resolution and range of the method in accordance with the invention, it is important to realize that a reflection phasor from the far end of an optical fiber cable will rotate more for a given delay or distance if the modulation frequency $w_m$ is varied over a larger span. The maximum total rotation, or envelope phase shift, can be achieved when the first modulation frequency $w_{m1}$ is the lowest possible and the second modulation frequency $w_{m2}$ is the maximum possible. For the hardware implementation described earlier in conjunction with FIG. 2, the maximum modulation frequency span is approximately 2.997 GHz, which translates to a minimum theoretical distance resolution of 5.0 cm (for n=1) (or 3.42 cm for n=1.46) between any two adjacent reflections. As greater modulation frequency spans are achieved, the minimum theoretical distance resolution between two adjacent reflections will decrease per the equation given in the preceding paragraph. Depending upon the digital signal processing limitations (transform resolution) and signal-to-noise ratio, a practical measurement may fall short of this resolution.

In order to determine the maximum range of the measurement system, it is desirable to introduce the smallest possible envelope phase shift between two subsequent measurements in order not to exceed the unambiguous or aliasing free range of the phase detector incorporated into the tuned vector receiver 24. If the maximum phase detector range is exceeded, aliasing will occur and the distance measurement becomes multi-valued. This can be avoided by choosing the smallest available modulation frequency increment. The maximum delay range $t_{max}$ then becomes the ratio of the phase detector range (e.g., $2\pi$) divided by the smallest modulation frequency increment delta $w_{min}$. The measurements described above can also be applied in a transmission mode to detect multi-path transmission and other deficiencies in the propagation medium.

Figure 8:
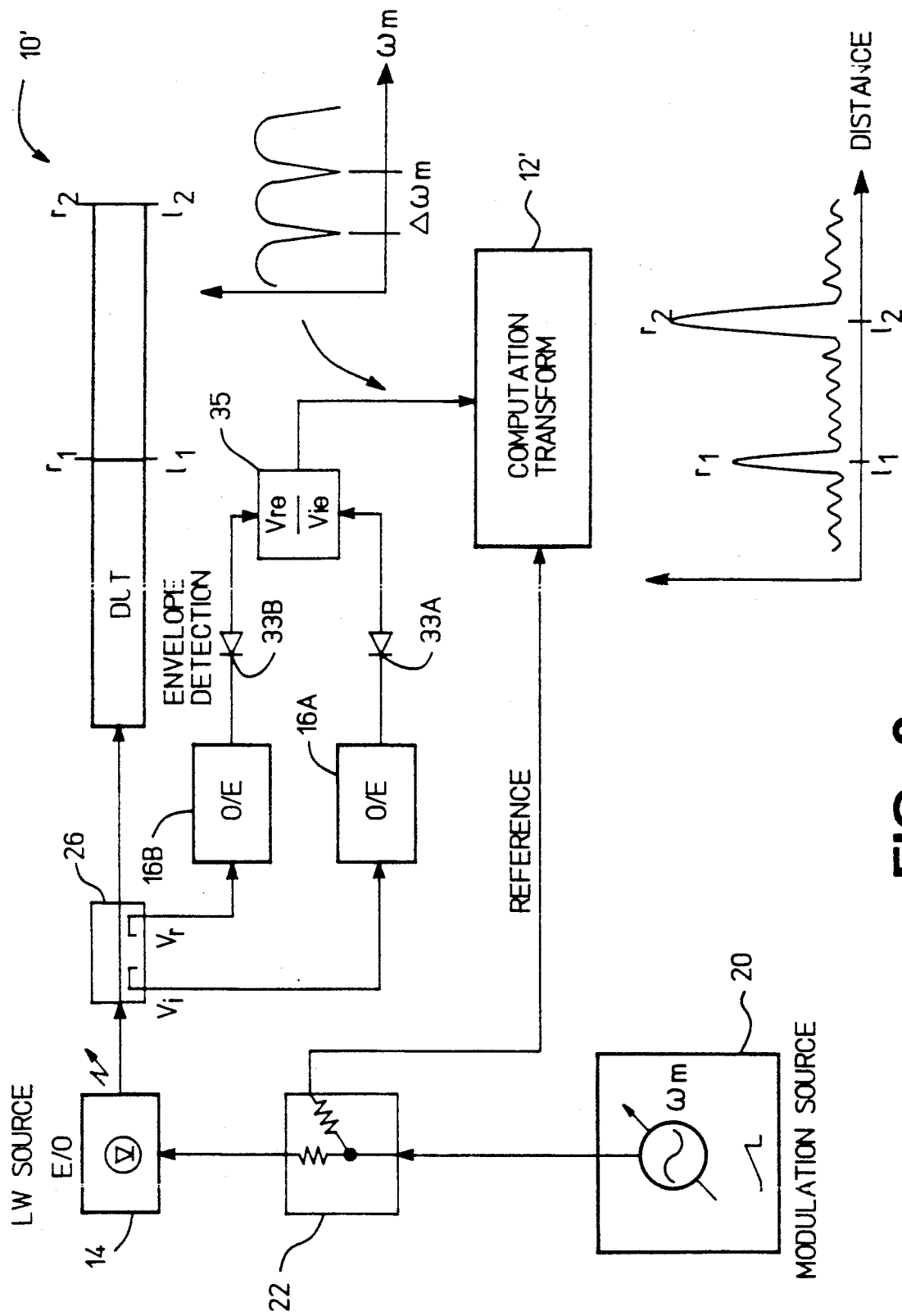
FIG. 8 is a block diagram of a modified lightwave component measurement system configured for measuring optical reflections to locate a discontinuity in, or to measure the length of, an optical transmission medium.

Previously, optical power meters have been used to measure optical reflections, which only yields an average reflection coefficient with no indication of how many reflections are involved or what their individual strength or position of origin are. As shown in FIG. 8, a modified lightwave component measurement system 10' similar to the lightwave component measurement system 10 shown in FIG. 3 is provided. The lightwave component measurement system 10' is a scalar measurement instrument which simply incorporates envelope detectors 33A and 33B and a ratioing circuit 35 which produces an electrical signal correlated to the ratio of the detected reflected modulated optical signal to the detected incident modulated optical signal, which is in turn fed to a lightwave component analyzer 12'. The splitter/combiner 22 also feeds a portion of the modulation signal produced by the modulation source 20 to the lightwave component analyzer 12'. The lightwave component analyzer 12' uses the measured modulation frequency domain information to reconstruct the ripple pattern from which to compute the distance to discontinuities in, or the length of, the optical transmission medium (DUT) according to the expressions derived above.

In accordance with the invention, the lightwave component analyzer 12 or 12' included in the lightwave component measurement system 10 or 10' preferably incorporates in firmware a set of encoded softkey menus, instructional text displays, and pictorial block diagram displays which guide and aid a user while connecting the DUT for a desired measurement, as well as during calibration and measurement processes. Code for generating user selections, instructions, and diagrams is embedded as a portion of the instrument mainframe firmware.

The lightwave component analyzer 12 or 12' has programmed into its read only memory (ROM) firmware a set of executable instructions to generate a combination of text and graphics which are displayed to make the lightwave component measurement system 10 or 10' easy to operate and use. The text and graphics show the user how to set up the lightwave component measurement system 10 or 10' so that a distance and magnitude measurement for a discontinuity, or a length measurement, can be performed easily and quickly. The firmware also incorporates coded instructions for performing a Fourier analysis of the modulation frequency domain information to convert this information to time domain data, as well as coded instructions for calculating distance or length in accordance with the method of the invention described earlier and displaying distance or length on the CRT 18.

Figure 9:
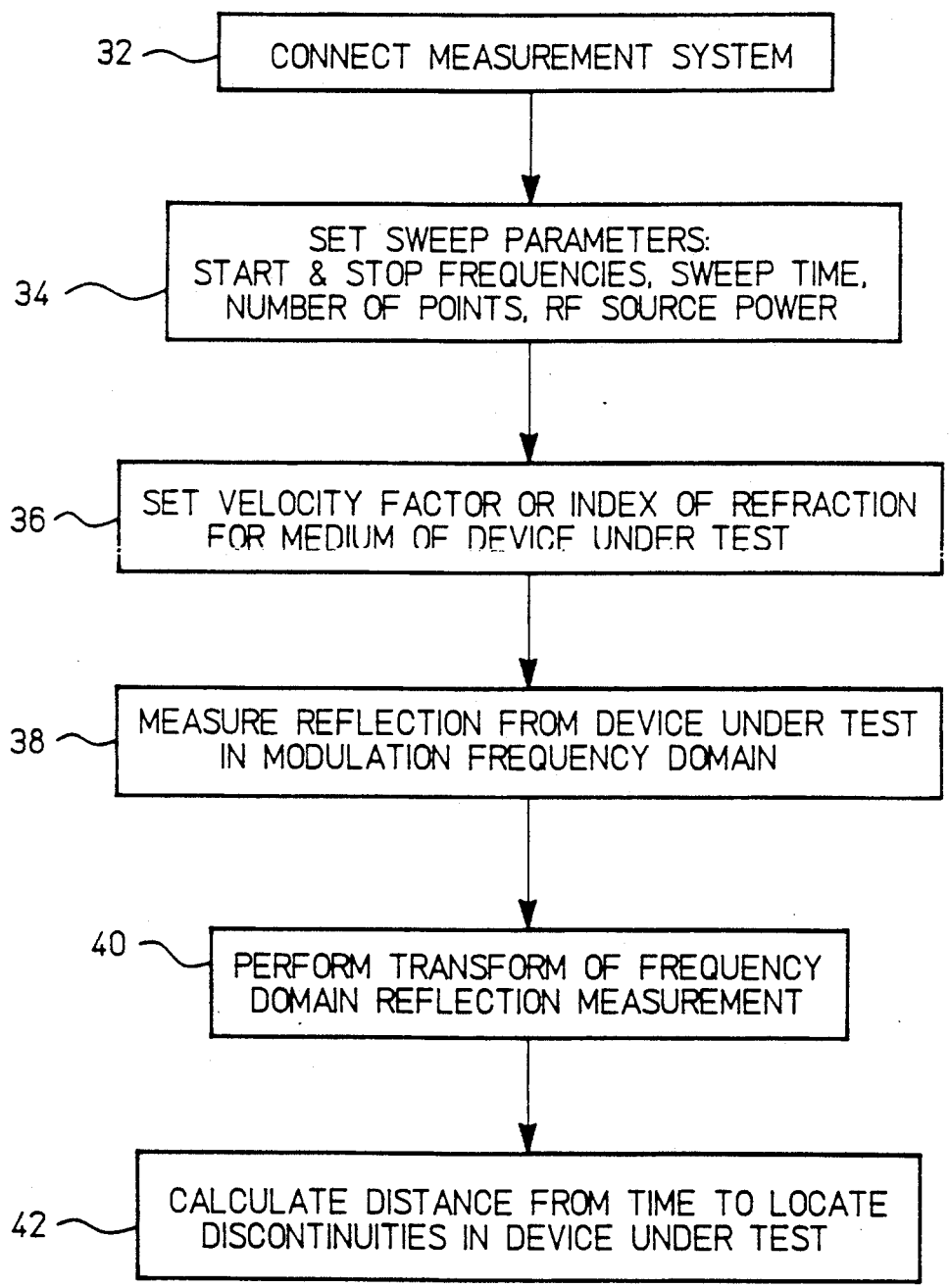
FIG. 9 is a flow chart for selecting and performing a distance and magnitude measurement for discontinuities and/or length in an optical transmission medium in accordance with the method of the invention.

Considered in more detail, FIG. 9 is a flow chart of the distance (length) measurement method in accordance with the invention. As indicated by the numeral 32 shown in FIG. 9, initially, the lightwave component measurement system 10 or 10' is configured for locating a discontinuity in and/or measuring the length of the DUT by connecting the DUT to the lightwave component measurement system, as shown in FIG. 2. Next, the user sets various sweep parameters, such as sweep start and stop frequencies, sweep time, number of data points, and electrical source power, as indicated by the numeral 34 shown in FIG. 9. Then, the user enters the index of refraction for the optical transmission medium (DUT), as indicated by the numeral 36. At this juncture, the lightwave component measurement system 10 or 10' is in readiness for a measurement.

The user then commands the lightwave component measurement system 10 or 10' to measure a reflection(s) from the DUT in the modulation frequency domain, as indicated by the numeral 38. Thereafter, the lightwave component analyzer 12 or 12' preferably performs an inverse Fourier transform of the modulation frequency domain information obtained from the measurement into time domain data, as indicated by the numeral 40. Finally, the lightweight component analyzer 12 or 12' computes the distance to a discontinuity in, and/or the length of, the DUT, as indicated by the numeral 42.

The firmware code associated with connecting the DUT to the lightwave component measurement system 10 or 10', setting the sweep parameters, and measuring, as indicated by the steps 32, 34, and 38, respectively, shown in FIG. 9, is substantially the same as the firmware code in the aforementioned HP 8753 vector network analyzer. Also, the firmware code associated with setting the index of refraction, as indicated by the step 36, is equivalent to the firmware code associated with setting a velocity factor in connection with electrical measurements in the HP 8753 vector network analyzer. The following pages contain a copy of the firmware code for an inverse chirp-Z Fourier transform which converts frequency domain information to time domain data which can also be applied to convert modulation frequency domain information to time or distance data in accordance with step 40 shown in FIG. 9 (pages 24-61) and the coded algorithm for calculating distance from time in accordance with step 42 shown in FIG. 9 (pages 62-65).

Considered in more detail, the line of code labeled 100 on page 62 determines whether or not the value to be displayed is a measure of time. The lines of code labeled 101 calculate a distance corresponding to time based on a propagation velocity equal to the speed of light. The lines of code labeled 102 determine whether or not the time is for one-way transmission or two-way reflection, and if the time is for two-way reflection, then the one-way distance is calculated. The lines of code labeled 103 select the appropriate units of distance. The lines of code labeled 104 display the distance. The lines of code on page 63 labeled 200 calculate the delay as the slope of phase versus frequency, that is, −Delta Phi/Delta w. The lines of code on pages 64 and 65 measure the optical delay −Delta Phi/Delta w at the frequency indicated by an active marker positioned by the user. The lines of code labeled 300 set up the trace to measure the delay. The lines of code labeled 301 measure the delay −Delta Phi/Delta w, thereby causing lines of code labeled 200 described above to be executed. The line of code labeled 302 reads the delay value at the active marker. The line of code labeled 303 sets the electrical delay parameters to the value read at the active marker. These electrical delay parameters are in units of time. The distance corresponding to the time is displayed by lines of code labeled 100-104 described above. Finally, lines of code 304 restore the trace to the state which existed prior to measuring the delay.

```
M68KL,P,"time"
BEGIN
COMMENT
***********************************************************************
*
* This module contains the code for the TIME DOMAIN and GATING functions
*
***********************************************************************
;

#FILE fdatap;
#FILE ccompute;                                              & correct_switch &
#FILE futil3;
#FILE cmsgtime;
#FILE cmessag0;
#FILE futil2;
#FILE crins;
#FILE fkernel;
#FILE fkernel4;                                                       &preempt&
#FILE fchtable;                                              & e_ch_quad &
#FILE cchtable;
#FILE fchtab2;                                    & ch_quad, ch_real, ch_int &
#FILE fchtab3;
#FILE fcontvar;                                              & for set_dp_vars &
#FILE fmemmgr;
#FILE fsize;
#FILE fstimuli;
#FILE ccal;                                                  & for correct_on &
#FILE fcal0;            & for allocate_ and deallocate_correction_array &
#FILE facttbl2;                         & for get_dom                   &
#FILE ccalmenu;                         & for Ccorrection               &
#FILE cdommenu;                         & for Cgate                     &
#FILE fchdata;                              & for curr_e_ch   &
#FILE fswpbrk;
#FILE fmenu2;
#FILE ftrace1;

PROCEDURE copy_user3( from_addr, to_addr, size );
              VALUE from_addr, to_addr, size;
              DOUBLE from_addr, to_addr; INTEGER size; EXTERNAL;
    PROCEDURE ifft(adr);
       VALUE adr;  DOUBLE adr;                                EXTERNAL.L;
    PROCEDURE fft(adr);
       VALUE adr;  DOUBLE adr;                                EXTERNAL.L;
    PROCEDURE fftun(adr);
       VALUE adr;  DOUBLE adr;                                EXTERNAL.L;

REAL PROCEDURE BESI(x);  VALUE x;       REAL x;           EXTERNAL;
    REAL PROCEDURE SQRT(x);  VALUE x;       REAL x;           EXTERNAL;
    REAL PROCEDURE  SIN(x);  VALUE x;       REAL x;           EXTERNAL;
    REAL PROCEDURE  COS(x);  VALUE x;       REAL x;           EXTERNAL;
```

```
SUBROUTINE MPY2E_ptrs;                                              EXTERNAL;
SUBROUTINE MPY2E_ptr;                                               EXTERNAL;
SUBROUTINE MPY2E;                                                   EXTERNAL;
SUBROUTINE MPYE_ptrs;                                               EXTERNAL;
SUBROUTINE MPYE_ptr;                                                EXTERNAL;
SUBROUTINE MPYE;                                                    EXTERNAL;
SUBROUTINE DIVE_ptr;                                                EXTERNAL;
SUBROUTINE fetch_CNVE1;                                             EXTERNAL;
REAL PROCEDURE CNV2E(x); VALUE x;          REAL x;                  EXTERNAL;
SUBROUTINE magE;                                                    EXTERNAL.L;
SUBROUTINE angE;                                                    EXTERNAL.L;
SUBROUTINE DVR2;                                                    EXTERNAL;
SUBROUTINE fst_trig_long;                                           EXTERNAL.L;
SUBROUTINE fst_trig;                                                EXTERNAL.L;
SUBROUTINE ary_corr;                                              EXTERNAL.L;
SUBROUTINE ary_trace_math;                                       EXTERNAL.L;
SUBROUTINE set_dc_elec_length;                                    EXTERNAL.L;
SUBROUTINE ary_elec_length;                                       EXTERNAL.L;
EXTERNAL REAL TwoPi, Pi;
EXTERNAL DOUBLE TABLE corr_tbl.L;

DOUBLE dp_scr_array_time,
       dp_scr_array_freq,
       chirp_array,
       gate_array,
       pre_gate_array,
       post_gate_array,
       old_FsTs;
INTEGER num_fpts,
        num_tpts,
        ary_sz,
        fft_pts,
        chan,
        gate_parm,  old_gate_parm,
        stim,       old_stim;
REAL   time_window, old_time_window;
GLOBAL INTEGER fft_size;
GLOBAL BOOLEAN new_tdr_freq;
BITFIELD td_sts: compute_gate, compute_xform,flag,tdr_mode;
INTEGER CONSTANT compute_mask := %000C;   & mask for compute_gate,xform &
                                          & order important &
REAL   Fo, Fs,
       gate_cen_Fs,
       GspanFs,
       old_gate_cen_Fs,
       old_GspanFs,
       x0;                                &computed dc values&
INTEGER CONSTANT impulse := impulse_tdr,
        nop := 0,   mpy  := 1,   sum := 2;

INTEGER TABLE  pre_wind := 4;
INTEGER TABLE gate_wind := 8, 5, 5, 2;
INTEGER TABLE gate_size := 10,5, 2, 2;    & numbers reversed from 8510 &

$EJECT;COMMENT                                                      tdr_check
**************************************************************************
*
**************************************************************************
;
PROCEDURE tdr_check;                                                ENTRY;
BEGIN
 QUAD start, step, stop,
      pts ;

& IF new_tdr_freq THEN    ?? dds &
     BEGIN
       acquire( acquisition_variables );
       pts := QUAD(num_of_1mpts);
       start := e_ch_quad( ch_start_frequency );
       stop  := start + e_ch_quad( ch_frequency_span );
       step := stop / pts;
       IF ( stop <> start*pts ) THEN
          BEGIN
            IF step < 300000 THEN
              BEGIN
                step := 300000;
```

```
              set_e_ch_quad( step*(pts - 1), ch_frequency_span );
            END;
            set_e_ch_quad( step, ch_start_frequency );
            set_e_ch_quad( step*(pts - 1), ch_frequency_span );
            upd_sscs_ch( curr_e_ch, freq_domain );
            tell( tdr_freq_change );
            beep_error;
            brk_swp_srce;
            check_cal( cpld_ch (ch_start_frequency) );
         END;
      new_tdr_freq := FALSE;
      release( acquisition_variables );
    END new_tdr_freq;

END  tdr_check;

COMMENT                                                       tdr_check_if
**************************************************************************
* calls tdr_check if tdr type is a low pass type
**************************************************************************
;
SUBROUTINE tdr_check_if;                                      ENTRY;
 BEGIN
   IF ch_bitmap( Ctdr_impulse, curr_e_ch ) <= step_tdr  THEN
     tdr_check;
 END;

#EJECT;COMMENT                                          cont_datap_time
**************************************************************************
*
**************************************************************************
;
PROCEDURE  cont_datap_time( channel );
    VALUE   channel;
    INTEGER channel;                                          ENTRY;
    BEGIN & cont_datap_time &
       flag := 1;
    END; & cont_datap_time &

#EJECT;COMMENT
**************************************************************************
*
* results in a fractional part x 2**32
**************************************************************************
;
DOUBLE PROCEDURE cyc_frac(x);    VALUE x;    REAL x;
BEGIN
BYTE xexp=x+3, exp;
DOUBLE xd=x;
INTEGER i7 = REGISTER 7, i6 = REGISTER 6; & to prevent local usage & exp := xexp+1;
  xd  := xd AND $FFFFFF00;
  cyc_frac := IF  exp<0  THEN  ARIGHT(xd,-exp) ELSE  ALEFT(xd,exp);

END cyc_frac;

#EJECT; COMMENT
**************************************************************************
*  compute_dc_value is a copy of Dave's routine from his report
*
*  Averaging the pt-1, pt_2 values would provide more dc stability, and
*     improve baseline stability also.
*  Probaby a fix value exp averaging that is reset on any control_time
*     changes and on measurment restart, and ??????????
**************************************************************************
end of comment;
PROCEDURE   compute_dc_value;
BEGIN
REAL x1, y1,
     x2, y2,
     x_delta,  x_temp,
     raduis,   x_center;
```

```
    ASSEMBLE( MOVE.L  dp_scr_array_freq, R8;
             JSR     fetch_CNVE1;    MOVE.L R0,x1;    MOVE.L R1,y1;
             ADDQ.L  #6,R8;
             JSR     fetch_CNVE1;    MOVE.L R0,x2;    MOVE.L R1,y2);

IF ABS( (x_delta := x2 - x1 ) ) >.001 THEN
         BEGIN     & x seperation enought to aviod noise or DIV by Zero &
         x_center :=  .5 *( x2 + x1 + ( y2 + y1 )*( y2 - y1 ) / ( x_delta ));
                           & DANGER    x2 = x1 problems &
         x_temp     :=   x1 - x_center;
         raduis     :=   SQRT( ( x_temp*x_temp ) + ( y1*y1 )  ) ;
         x0         :=   x_center  +  ( IF y1<0 THEN raduis ELSE -(raduis) ) ;
         END
    ELSE  & signal too small or too close &
         x0 := x1;
    CNV2E( x0 );
    ASSEMBLE( MOVE.L   dp_scr_array_time, R8;
             CLR.W         (R8)+;
             MOVE.W  R0,  (R8)+;
             MOVE.W  R1,  (R8)+     );
END;

REAL PROCEDURE   compute_tg0_value;
BEGIN
REAL delta_ang ;
    ASSEMBLE( MOVE.L dp_scr_array_time, R8;
             MOVE.L (R8)+,  R0;   MOVE.L R0,R2;   SWAP   R2;
             MOVE.W (R8)+,  R1;   MOVE.W R1,R2;   MOVE.L R2,    x0;
             JSR    DIVE_ptr;
             JSR    angE;
             MOVE.L R0, delta_ang   );
    compute_tg0_value := delta_ang / ( 360. * Fs );
END compute_tg0_value;

#EJECT;COMMENT
****************************************************************
*
*    sum in ramp portion of step response
*        see Dave's report pg6,7, this is presently only the linear portion
****************************************************************
;
PROCEDURE td_ramp(adr, FsTo, FsTs);
              VALUE adr, FsTo, FsTs;
              DOUBLE adr;  REAL FsTo, FsTs;
BEGIN
    DOUBLE ptr12 = REGISTER 12;                    & freeze use of R12 &
    REAL t, correction;

t    := FsTo;
    ptr12 := adr;

REPEAT num_tpts DO           &do the H(0) * Fs * T ramp correction &
         BEGIN
         correction  :=   ( x0 * t ) ;
         ASSEMBLE (  CLR.W         (R12)+;      & clear imag part &
                     MOVE.L  correction, R0;
                     MOVE.L  (R12), R1;         JSRX  ADD2;
                     SWAP    R0;                MOVE.W  R0,(R12)+;
                     SWAP    R0;                MOVE.W  R0,(R12)+   );
         t     :=  t + FsTs;                            &becomes FsT &
         END pts loop;

END td_ramp;

#EJECT;COMMENT
****************************************************************
*
*    two array multiply
****************************************************************
;

PROCEDURE array_mpy( adr1, adr2, pts);
          VALUE adr1,adr2,     & input1, input2 ( output )&
               pts; INTEGER pts;    & array size &
               DOUBLE adr1,adr2;
```

```
BEGIN
INTEGER loopctr = REGISTER 7;
LABEL loop, test;
   ASSEMBLE(
                  MOVE.L   adr1,   R8;
                  MOVE.L   adr2,   R10;
                  MOVE.L   R10,    R13;
                  MOVE.W   pts,    loopctr;
                  BRA      test;
        loop:     JSR      MPYE_ptrs;
                  MOVE.L   R0,  (R13)+;
                  MOVE.W   R1,  (R13)+;
        test:     DBRA     loopctr, loop              );

preempt;
END array_mpy

COMMENT                                                      stim_mpy
**********************************************************************
*  Multiplies a scalar array by a vector array
*    Depending on mode, it will also do a real/imag swap of the
*       resultant array for all points but the first ( for step )
**********************************************************************
;
PROCEDURE stim_mpy( adr1, adr2, pts, mode);
   VALUE adr1,adr2,      & input1, input2 ( output )&
         pts, mode;
   INTEGER pts, mode;
   DOUBLE adr1, adr2;
BEGIN
INTEGER loopctr = REGISTER 7;
LABEL loop1, loop2, test1, test2;

ASSEMBLE(    MOVE.L  adr1, R10;      & real word &
             MOVE.L  adr2, R8;       & complex word &
             MOVE.L  R8,   R13;
             MOVE.W  pts,  loopctr;
             BRA     test1;
    loop1:   JSR  MPY2E_ptrs;
             MOVE.L  R0, (R13)+;
             MOVE.W  R1, (R13)+;
    test1:   DBRA    loopctr, loop1 );

IF mode <> impulse THEN         & do the 1/j mpy needed for step &
   ASSEMBLE(  MOVE.L  adr2, R13;
              MOVE.W  pts,  loopctr;
              SUBQ    #2, loopctr;    & skip first point &
    loop2:    ADDQ.L  #6, R13;
              MOVE.L  (R13), R0;
              SWAP    R0;
              NEG     R0;
              BVC     test2;
              MOVE    =H7FFF, R0;
    test2:    MOVE.L  R0, (R13);
              DBRA loopctr, loop2 );

preempt;

END stim_mpy;

#EJECT;COMMENT
**********************************************************************
          zero out imag part ( only real )
**********************************************************************
;
PROCEDURE array_zero_imag(adr, pts ); VALUE adr ,pts ;
                                      DOUBLE adr;     INTEGER pts ;
BEGIN
 INTEGER loopctr=REGISTER 7;
 LABEL loop, test;
 ASSEMBLE(
          MOVE.L   adr,   R8;
          MOVE.W   pts,   loopctr;
          BRA      test;
    loop: CLR.W         (R8);
          ADDQ.L   #6,   R8;
    test: DBRA     loopctr, loop         );
END array_zero_imag;
```

COMMENT
*****************************************************************
         zero out array   R11 has ptr,   R7 has repeat count
*****************************************************************
;
SUBROUTINE   array_zero;
BEGIN
LABEL loop, test;
ASSEMBLE(
                 BRA        test;
         loop:   CLR.L      (R11)+;
                 MOVE.W     =H80, (R11)+;
         test:   DBRA       R7,   loop           );
END array_zero;

PROCEDURE user3_zero( addr, numb);
                 VALUE addr, numb; DOUBLE addr; INTEGER numb;       ENTRY;
BEGIN
     ASSEMBLE(   MOVE numb, R7;  MOVE.L addr, R11;  BSR array_zero );
END user3_zero;

$EJECT; COMMENT
*****************************************************************
* builds the chirp array -- builds it in three stages
*       stage 1 the zero pt
*       stage 2 the first and last segments which are mirror images
*               and are pts - 1 long
*       stage 3 the middle segment is zeroed out -- this is size+1-2*pts
*
* NOTE: PROCEDURE ASSUMES THAT num_fpts >= num_tpts.
*   This is not a chirp xform limitation - just a limitation of the
*   the mod done to this procedure to allow different number of points
*****************************************************************
end of comment;
PROCEDURE build_chirp( adr, fpts, FsTs );  VALUE adr, fpts, FsTs;
                                 DOUBLE adr, FsTs;   INTEGER fpts;
BEGIN
INTEGER POINTER ptr11=REGISTER 11, ptr12=REGISTER 12;
DOUBLE ang_delta=REGISTER 3, ang_inc=REGISTER 6, ang=REGISTER 9;
INTEGER loopctr =REGISTER 7;
LABEL loop, test, skip1, azero, check;

STPNTR(ptr11, adr); STPNTR(ptr12, adr+ary_sz);
     ASSEMBLE(CLR.W      (R11)+;  MOVE.L =H40000001, (R11)+  );
                                    & set first val = 1.0& ang_delta := -FsTs;
     ang_inc   := ang := ARIGHT(ang_delta,1);
     ASSEMBLE(                                 & R11 is first segment &
              MOVE.W  fpts, loopctr;           & R12 is last  segment &
              SUB     #1, loopctr;
              BRA     test;
       loop:  MOVE.L  ang, R0;
              JSR     fst_trig_long;           & uses R0,1,4,5,10 &
              MOVE.W  R1, -(R12);     & CLR.W     -(R12); &
              MOVE.L  R0, -(R12);
              CMPA.L  R11, R12;
              BLE     skip1;
              MOVE.L  R0, (R11)+;
              MOVE.W  R1, (R11)+;     & CLR.W     (R11)+; &
      skip1:  ADD.L   ang_delta,ang_inc;
              ADD.L   ang_inc,ang;
       test:  DBRA    loopctr, loop            );

ASSEMBLE(
              BRA check;
      azero:  CLR.L    (R11)+;
              CLR.W    (R11)+;
      check:  CMPA.L R11, R12;
              BGT  azero  );

ifft(adr );
     fftun(adr );                    & includes a preempt &

END build_chirp;

EJECT; COMMENT
*********************************************************************
*generate a window array -- with various parameters
*   mode = TRUE for base band / FALSE for band pass
*
*  modified so it stores only real values unless the mpy option
*     is specified, it which case it does a real*complex multiply
*
*********************************************************************
;
REAL PROCEDURE td_window(adr, wind_parm, mode, pts, opt);
    VALUE adr,wind_parm,mode, & array adr, window parm, mode&
          pts,opt;           & number of data pts,&
    DOUBLE adr; INTEGER wind_parm, pts, opt; BOOLEAN mode;
BEGIN
 REAL parm,X,G,FN,SUM,norm;  INTEGER N;  BOOLEAN rect;
 DOUBLE POINTER ptr12=REGISTER 12;

IF mode THEN   N:= 0  ELSE N:= -ARIGHT(pts-1, 1) ;
 SUM:=0.;

FN := 2.0/REAL(pts -1);                                &rf modes&
 IF mode THEN FN := .5 * FN;                            &baseband& rect := ( wind_parm = 0 );
 parm := REAL( wind_parm );

norm:=1./BESI(parm);

STPNTR(ptr12,adr);                 &besi and Sqrt do not use reg12&
 REPEAT pts DO                      &compute/store window loop&
   BEGIN
   X:=REAL(N)*FN;

IF (N=0) OR rect THEN G:=1.0 ELSE
     G:=BESI( parm * SQRT( 1- X*X ) ) * norm ;          &bess&

IF opt = sum THEN BEGIN                              &sum&
     IF N>0 AND mode THEN G:=2.*G;&double for non dc terms&
     SUM:=SUM+G; END;                                   & MOVE ???? &

IF opt = mpy THEN
         ASSEMBLE(  MOVE.L G, R2;
                    MOVE.L R12, R8;
                    JSR MPY2E_ptr;
                    MOVE.L R0, (R12)+;
                    MOVE.W R1, (R12)+ )
      ELSE
         ASSEMBLE(  MOVE.L G, (R12)+ );

N := N + 1;

END pts loop ;

preempt;
td_window:=SUM;
END td_window;

EJECT;COMMENT
*********************************************************************
*
*********************************************************************
;
PROCEDURE td_stim(adr);
   VALUE adr;  DOUBLE adr;
 BEGIN
  REAL G1,G0,G,GS;
  REAL POINTER ptr12=REGISTER 12;
  INTEGER N;

G1 := td_window( adr, time_window,
                   tdr_mode, num_fpts, sum );
                                                   &create window first&
                                                   &remember area &
             &COMPENSATE FOR LACK OF 1/N IF ifft&

EJECT;COMMENT
*************************************************************
* special routine for use by the run time chirp
*************************************************************
end of comment;
SUBROUTINE mpy_chirp;
    BEGIN
    LABEL loop, test;
    INTEGER loopctr=REGISTER 7;
    DOUBLE ang_delta=REGISTER 12, ang_inc=REGISTER 6, ang=REGISTER 9;
    ASSEMBLE(
                    BRA     test;
            loop:   MOVE.L  ang, R0;
                    JSR     fst_trig_long;      & CLR.W R1; &
                    MOVE.L  R11, R8;
                    JSR     MPYE_ptr;
                    MOVE.L  R0, (R11)+;
                    MOVE.W  R1, (R11)+;
                    ADD.L   ang_inc, ang;
                    ADD.L   ang_delta, ang_inc;
            test:   DBRA    loopctr, loop                       );
END mpy_chirp;

EJECT;COMMENT
*************************************************************
*************************************************************
end of comment;
PROCEDURE chirpxfm(adr1,adr2,fpts,tpts,FsTs,FsTo,FoTs,FoTo);
    VALUE adr1,adr2,       & adr ptr to scr and chirp arrays &
          fpts,            & # of freq pts available &
          tpts,            & # of time pts to generate &
          FsTs,FsTo,       & FreqStepTimeStep, FreqStepTimeInit products &
          FoTs,FoTo;       & FreqInitTimeStep, FreqInitTimeInit products &
    DOUBLE adr1,adr2;
    INTEGER fpts, tpts; DOUBLE FsTs,FsTo,FoTs,FoTo;
BEGIN
    DOUBLE ang_delta=REGISTER 12, ang_inc=REGISTER 6, ang=REGISTER 9;
    INTEGER POINTER ptr11=REGISTER 11;
    INTEGER loopctr=REGISTER 7;

& the actual chirp-Z code &
    & see DAVE'S paper         & ang_delta := FsTs;
    ang_inc   := ang := FsTo + ARIGHT(ang_delta,1);
    ang_inc   := ang_inc + ang_delta;
    loopctr:=fpts-1;
    STPNTR(ptr11,adr1+6);           & skip first mpy -- it is by one &
    mpy_chirp;

ASSEMBLE(  MOVE.W   fft_pts, loopctr;    SUB.W  fpts, loopctr;
               BSR      array_zero                  );

ifft( adr1 );
    fftun( adr1 );                  & includes a preempt &

&NOTE: UNSCRAMBLING NOT REQUIRED IN CHIRPXFM IF A SECOND
           FFT IS WRITTEN THAT ACCEPTS SCRAMBLED INPUTS.& array_mpy( adr2, adr1, fft_pts );                    .& CONVOLUTION & fft(adr1);
    fftun(adr1);                    & includes a preempt &

STPNTR(ptr11, adr1);
    ang_delta := FsTs;
    ang_inc   := FoTs + ARIGHT(ang_delta,1);    ang := FoTo;
    loopctr:=tpts;                              &mpy by down chirp &
    mpy_chirp;

END chirpxfm;

```
   G0:= 1.0/(G1*REAL(fft_pts));      &Normalize to height,&
   GS:=-1.0/(REAL(fft_pts)*TwoPi);
                       &for step \ area is 1, no normalizing needed&

STPNTR(ptr12,adr);
   FOR N := 0 TO num_fpts - 1 DO
     BEGIN
       IF stim = impulse THEN  G := G0              & impulse &
        ELSE  BEGIN IF N<>0 THEN G:=GS/REAL(N)      & step harmonics &
                   ELSE G := .5/REAL(fft_pts);     & step DC &
             END;
      ptr12[N] := ptr12[N] * G;
    END loop;

END td_stim ;

#EJECT; COMMENT
-*****************************************************************
******************************************************************
end of comment;
PROCEDURE do_time_domain;
BEGIN
REAL To, Ts, tg0;

DOUBLE FoTo, FoTs, FsTo, FsTs ;
DOUBLE temp;

To  := ch_real( ch_start_xform , chan );
    Ts  := ch_real( ch_xform_span , chan)/ REAL( num_tpts - 1 );

FoTo := cyc_frac( Fo * To );
    FoTs := cyc_frac( Fo * Ts );
    FsTo := cyc_frac( Fs * To );
    FsTs := cyc_frac( Fs * Ts );
    IF tdr_mode THEN stim := ch_bitmap( Ctdr_impulse, chan )
     ELSE            stim := impulse;
    time_window := ch_real( ch_window, chan ) ;

IF ( FsTs # old_FsTs ) OR ( old_stim # stim )
           OR ( old_time_window # time_window ) THEN flag := 1;

IF (mem_stolen(chirp_array, td_chirp_arrays_id,
                  ( ary_sz + 6 + 4*num_mpts[ chan ]))
           OR flag ) AND ( chirp_array # 0 ) THEN
      BEGIN
      tell( comp_time_coeff );
      old_FsTs := FsTs;
      old_stim := stim;
      old_time_window := time_window ;
      build_chirp( chirp_array , num_fpts,  FsTs );
      td_stim( chirp_array + ary_sz );
      clr_msg( comp_time_coeff );
      END;
#EJECT;
    IF chirp_array # 0 THEN
        BEGIN IF tdr_mode THEN    tg0 := compute_tg0_value;

IF ch_bit( Cwindow_mem, chan ) = 1 THEN
           BEGIN
             temp := ch_dbl( ch_m_base, chan );
             IF temp <> 0 THEN
                BEGIN
                  array_mpy( temp, dp_scr_array_time, num_fpts - tdr_mode);
                  IF tdr_mode THEN
                     user3_zero( dp_scr_array_time + (num_fpts-1)*6, 1 );
                END;
             END
           ELSE
             stim_mpy( chirp_array + ary_sz,
                              dp_scr_array_time, num_fpts,  stim );

chirpxfm( dp_scr_array_time, chirp_array,  num_fpts, num_tpts,
                   FsTs, FsTo, FoTs, FoTo  );
```

```
       IF tdr_mode THEN
          BEGIN
          IF stim = impulse_tdr THEN
                  array_zero_imag(dp_scr_array_time, num_tpts )
             ELSE td_ramp( dp_scr_array_time, Fs*(To-tg0),Fs*Ts );
             END tdr_domain cleanup ;

release_mem_if( td_chirp_arrays_id ) ;
       END
    ELSE
       warn( exceeded_available_memory );

END do_time_domain;

#EJECT; COMMENT
***************************************************************
***************************************************************
end of comment;
PROCEDURE build_gate( gate_adr );
                   VALUE gate_adr;
        DOUBLE gate_adr;
BEGIN
  INTEGER loopctr=REGISTER 7;
  DOUBLE   temp12=REGISTER 12;        & prevents local use of R12  &
  DOUBLE   exp_step,
           exp_parm,
           temp = exp_parm;
  REAL  pt_0,
        sin_step, sin_dem,
        sin_real,
        n_real;
  INTEGER pts, n, loop,
        mant_pt_0 = pt_0,   exp_pt_0 = pt_0 + 2;
  LABEL loop3, test3;

pts := ( num_fpts/gate_size[gate_parm]) + 1 ;
     IF pts <= 1 THEN pts := 2;    & to solve 3 pts wide gate crashes &
     IF pts > ( fft_pts - num_fpts ) THEN
           BEGIN    & reduce gate points - assume bandpass gating only &
              pts := fft_pts - num_fpts;
           END;

pt_0    := GspanFs / REAL(fft_pts);             &scaling fft &
  sin_step := Pi * GspanFs ;
  sin_dem  := Pi * REAL(fft_pts*.5);              &scaling fft &

IF tdr_mode THEN
     BEGIN   pt_0 := pt_0 * 2.0 ;  sin_dem := sin_dem / 2.;   END;

exp_step := exp_parm := cyc_frac( -gate_cen_Fs );

ASSEMBLE(    MOVE.L  gate_adr, R12;       MOVE.W  pts,    loop;
               CLR.W            (R12)+;     SUB.W   #1,     loop;
               MOVE.W  mant_pt_0,(R12)+;    MOVE.W  #1,     n;
               MOVE.W  exp_pt_0, (R12)+        );

#EJECT;
     REPEAT loop DO
        BEGIN
        n_real:= REAL( n );
        sin_real := SIN( sin_step * n_real ) / (sin_dem * n_real) ;
                 & SIN does not use R12 --- rewrite this mess &
        ASSEMBLE(  MOVE.L  exp_parm, R0;   JSR fst_trig_long;
                   MOVE.W  R1, -(S);       & CLR.W  -(S); &
                   MOVE.L  R0, -(S);
                   MOVE.L  sin_real, R0;   JSR CNV2E;
                   MOVE.L  S,    R8;       JSR MPYE_ptr;
                   MOVE.L  R0,    (R12)+;
                   MOVE.W  R1,    (R12)+;
                   ADDQ.L  #6, S   );
        n := n + 1;
        exp_parm := exp_parm +. exp_step;
        END loop;

ASSEMBLE(   MOVE.L  R12, R11;                        & zero fill &
                 MOVE.W  fft_pts, loopctr;   SUB.W  pts,  loopctr;
                 BSR     array_zero      );   & R11 is adr, R7 count &
```

```
            td_window( gate_adr, gate_wind[ gate_parm ], TRUE,
                      pts,  mpy );

preempt;
    fft( gate_adr);
    fftun( gate_adr);      &only the real part used&

' ,COMMENT shrink array size by pulling out imaginary component;
    ASSEMBLE(  MOVE.L gate_adr, R8;
               MOVE.L R8,  R13;
               MOVE   fft_pts, R1;
               BRA    test3;
        loop3: ADDQ.L #2, R8;              & skip imaginary part &
               MOVE.L (R8)+, (R13)+;       & move real, exponent &
        test3: DBRA  R1, loop3 );
END build_gate;

#EJECT; COMMENT
****************************************************************
****************************************************************
end of comment;
PROCEDURE gate( data_adr, gate_adr );
         VALUE  data_adr, gate_adr;
         DOUBLE data_adr, gate_adr;
BEGIN
  LABEL exp_test,loop, test;
  INTEGER offset;
  INTEGER loopctr=REGISTER 7;

offset := 6 * num_fpts;
      ASSEMBLE(                          & zero fill data array&
              MOVE.L data_adr, R11;      ADDA.W  offset, R11;
              MOVE.W fft_pts, loopctr;   SUB.W  num_fpts,  loopctr;
              BSR    array_zero    );    & R11 is adr, R7 count &

IF tdr_mode THEN
          ASSEMBLE(                                    &half 1st pt??&
              MOVE.L data_adr,  R11;     ADDQ.L  #4, R11;
              MOVE.W (R11),     R0;      SUB.B   #1, R0;
              BVC    exp_test;           ADD.B   #1, R0;
        exp_test:MOVE.W R0,    (R11)     );

fft( data_adr);
      fftun( data_adr);& includes a preempt &

' , ASSEMBLE(
              MOVE.L  gate_adr, R10;   MOVE.L  data_adr,  R8;
              MOVE.W  fft_pts,loopctr; MOVE.L  R8,        R13;
              MOVE.L  #-1,      R5;
              BTST    =D0, td_sts+1;      &tdr_mode&
              BEQ     test;               &if flg false (0) branch &
              MOVE.L  =H0FFFF,  R5;       &real data only mask&
              BRA     test;
        loop: MOVE.L  (R8)+,    R0;
              AND.L   R5,       R0;
       .      MOVE.W  (R8)+,    R1:
              MOVE.L  (R10)+,   R2;       & real only &
              JSR     MPY2E;              & real * complex &
              MOVE.L  R0,       (R13)+;
              MOVE.W  R1,       (R13)+;
        test: DBRA    loopctr, loop    );

preempt;
      ifft( data_adr);
      fftun( data_adr);& includes a preempt &

END gate;

#EJECT; COMMENT
****************************************************************
*
*will at first use a fft size array ( adr ) but after  gating only
* the freq size array elements will be used
****************************************************************
end of comment;
PROCEDURE build_gate_comp( adr );
                VALUE adr;
```

```
         DOUBLE adr;
BEGIN
DOUBLE temp,
       ang_delta=REGISTER 12, ang=REGISTER 9;
INTEGER loopctr = REGISTER 7;
LABEL loop1, loop2, test1, test2;

temp      := - cyc_frac( gate_cen_Fs * Fo / Fs );
   ang_delta := - cyc_frac( gate_cen_Fs );
   ang       := temp;
   ASSEMBLE(
              MOVE.L  adr,    R13;
              MOVE.W  num_fpts,   loopctr;
              BRA     test1;
       loop1: MOVE.L  ang,    R0;
              JSR     fst_trig_long;
              MOVE.L  R0,     (R13)+;
              MOVE.W  R1,     (R13)+;
              ADD.L   ang_delta, ang;
       test1: DBRA    loopctr, loop1 );

td_window( adr, pre_wind, tdr_mode, num_fpts, mpy );

gate( adr, gate_array );

ASSEMBLE(                            & invert results &
              MOVE.L  adr,    R9;
              MOVE.L  R9,     R13;
              MOVE.W  num_fpts,   loopctr;
              BRA     test2;
       loop2: MOVE.L  (R9)+,  R0;
              MOVE.W  (R9)+,  R1;
              JSR     magE;            & uses R10 ! &
              MOVE.L  =F1.0,  R1;
              JSR     DVR2;
              MOVE.L  R0,     (R13)+;  & store as real array only &
       test2: DBRA    loopctr, loop2 ;
              MOVE.L  R13,    pre_gate_array                    );

td_window( pre_gate_array, pre_wind, tdr_mode, num_fpts, nop );
END build_gate_comp;
#EJECT; COMMENT
************************************************************************
************************************************************************
end of comment;
PROCEDURE do_gating;
BEGIN
REAL GoFs;
INTEGER temp_size, temp_size2;

GoFs    := Fs * ( ch_real(ch_gate_start, chan) );
   GspanFs := Fs * ( ch_real(ch_gate_span, chan) );
   IF GspanFs < 0. THEN GspanFs := 1.0 + GspanFs;
   IF ABS(GspanFs) > 1.0 THEN GspanFs := 1.0;
   gate_cen_Fs :=  GoFs + GspanFs / 2. ;
   gate_parm := ch_bitmap( Cmax_gate, chan);

IF ( old_gate_cen_Fs # gate_cen_Fs ) OR ( old_GspanFs # GspanFs )
         OR ( old_gate_parm # gate_parm )
      THEN flag := 1;

temp_size := INTEGER(ary_sz/3)*5;
   temp_size2 := INTEGER(ary_sz/3)*2 + 8*num_mpts[ chan ];
   IF temp_size2 > temp_size THEN temp_size := temp_size2;
   IF ( mem_stolen( gate_array, td_gate_arrays_id, temp_size ) OR
        flag ) AND (gate_array # 0) THEN
       BEGIN
       tell( comp_gate_coeff );
       old_gate_cen_Fs := gate_cen_Fs;      old_GspanFs := GspanFs;
       old_gate_parm := gate_parm;
       build_gate( gate_array );

post_gate_array := gate_array + INTEGER(ary_sz/3)*2;
       build_gate_comp( post_gate_array );
       clr_msg( comp_gate_coeff );
       END;
```

```
   IF gate_array # 0 THEN
     BEGIN

&Pre_comp&
     stim_mpy( pre_gate_array, dp_scr_array_time, num_fpts, impulse );

gate( dp_scr_array_time, gate_array );

&Post Comp &
     stim_mpy( post_gate_array, dp_scr_array_time, num_fpts, impulse );

release_mem_if( td_gate_arrays_id ) ;
     END
   ELSE
       warn( exceeded_available_memory );

END do_gating;

#EJECT;
COMMENT                                                              do_demod
*****************************************************************************
*
*  Does either the amplitude or phase demodulation of the data
*
*    Amplitude demod removes any phase modulation information
*        by replacing  x+jy with sqrt(x*x + y*y).
*
*    Phase demod removes any amplitude modulation information
*        by replacing  x+jy with x+jy/(sqrt(x*x + y*y)).
*
*****************************************************************************
;
PROCEDURE do_demod( adrs, pts, type );
  VALUE adrs, pts, type;
  DOUBLE adrs;  INTEGER pts, type;
  BEGIN
    INTEGER POINTER ptr12 = REGISTER 12;
    INTEGER loopctr = REGISTER 7;
    LABEL loop1, loop2;
    STPNTR( ptr12, adrs );
    loopctr := pts - 1;
    IF type = 1 THEN & amplitude demod &
        ASSEMBLE(
           loop1: MOVE.L  (R12), R0;
                  MOVE.W  4(R12), R1;
                  JSR     magE;
                  CLR.W   (R12)+;
                  MOVE.L  R0, (R12)+;
                  DBRA    loopctr, loop1 )
      ELSE          & phase demod &
        ASSEMBLE(
           loop2: MOVE.L  (R12), R0;
                  MOVE.W  4(R12), R1;
                  JSR     magE;
                  MOVE.L  =H40000001, R1;
                  JSR     DVR2;               & 1/|MAG| &
                  MOVE.L  R0, R1;
                  CLR.W   R0;
                  SWAP    R0;                 & convert real to E cpx &
                  MOVE.L  R12, R8;
                  JSR     MPYE_ptr;           & need real * cpx &
                  MOVE.L  R0, (R12)+;
                  MOVE.W  R1, (R12)+;
                  DBRA    loopctr, loop2 );

END;  & do demod &
```

EJECT;
COMMENT                                                                    size_of_fft
****************************************************************************
*
*    Could use a more efficient algorithm
*
****************************************************************************
;
INTEGER SUBROUTINE size_of_fft;
  BEGIN
            IF num_fpts > 402 THEN size_of_fft := 11      & 2k xform &
      ELSE IF num_fpts > 202 THEN size_of_fft := 10       & 1k      &
      ELSE IF num_fpts > 102 THEN size_of_fft := 9        & 512     &
      ELSE IF num_fpts > 52  THEN size_of_fft := 8        & 256     &
      ELSE size_of_fft := 7;                              & 128     &
  END;

EJECT; COMMENT
****************************************************************************
*
* HISTORY
* 8/9/83 -- error in computing Fs fixed
* 6/4/85 -- processing reordered, update_block parameter added
****************************************************************************
end of comment;
PROCEDURE ary_datap( update_block, ch );
    VALUE update_block, ch;
    INTEGER update_block, ch;                                       ENTRY;
BEGIN
DOUBLE ptrs_base  = REGISTER 11; & caution possible problem ?? dds 7/2 &
DOUBLE vars_base  = REGISTER 12;
DOUBLE POINTER dp_ptrs = ptrs_base;
DOUBLE POINTER dp_vars = vars_base;
INTEGER point, num_pts_freq, demod;
DOUBLE  dp_d,dp_m;
EJECT;
  compute_xform := ch_bit( Ctransform, ch );
  compute_gate  := ch_dm_bit( Cgate, ch,
            IF update_block = update_m THEN 0 ELSE 1 );
  num_fpts := num_pts_freq := num_mpts[ ch ];
  num_tpts := num_pts[ ch ];
  fft_size := size_of_fft;
  fft_pts := ALEFT(1, fft_size );
  IF ( td_sts AND compute_mask ) <> 0 THEN
          ary_sz := fft_pts
    ELSE ary_sz :=  num_mpts[ ch ] + 1;
  ary_sz := ary_sz * 6;
  mem_stolen( dp_scr_array_time, td_scr_arrays_id, ary_sz );
  IF dp_scr_array_time # 0 THEN
        BEGIN
        chan := ch;

dp_scr_array_freq := dp_scr_array_time;
        IF ch_bit( Ccw_time, chan ) THEN
            BEGIN
              tdr_mode := 0;
              demod := ch_bitmap( Cdemod_off, ch );
              Fo := 0.0;
              Fs := ch_real( ch_sweep_time, chan ) /
                    REAL( num_mpts[ chan ] - 1 );
            END
          ELSE
            BEGIN
              demod := 0;
              Fo   := REAL( ch_quad( ch_start_frequency, chan ));
              Fs   := freq_step( chan );
            END;

IF (( td_sts AND compute_mask ) <> 0 ) AND  ( demod = 0 ) AND
            ( ch_bitmap( Ctdr_impulse, chan ) <= step_tdr ) THEN
            BEGIN
            num_fpts := num_fpts + 1;
            dp_scr_array_freq := dp_scr_array_freq + 6;
            Fo       := 0.0 ;
            tdr_mode := 1;
            END  low pass domains
          ELSE tdr_mode := 0;

```
IF update_block = update_raw THEN
   BEGIN
      IF ch_bit( Ccorrection, ch ) = 1 THEN
         BEGIN
         COMMENT dds 10/13/85
         allocate_correction_array( ch );

& allocate may have turn off correction or move coeffs&
         IF ch_bit ( Ccorrection, ch ) = 0 THEN
            BEGIN
            set_vars_ptrs_base( 0 );                           &restore&
            dp_vars[ dp_correct_sw ]:= corr_tbl[ 0 ];
            END
         ELSE
            set_dp_ptrs(ch, 0, 1 & ch_trace_base & );

END ;

set_vars_ptrs_base( 0 );                                 & restore &
   dp_d := dp_ptrs[ dp_d_ptr ];

ASSEMBLE( MOVE num_pts_freq, R7;
             MOVE.L dp_scr_array_freq, R13
           );
   ary_corr;

copy_user3( dp_scr_array_freq,  dp_d, num_pts_freq );

END;

IF update_block = update_m THEN
   BEGIN
   set_dp_ptrs(ch, 0, 0 & ch_m_trace_base &);
   set_vars_ptrs_base( 0 );
   dp_m := dp_ptrs[ dp_m_ptr ];
   copy_user3( dp_m, dp_scr_array_freq, num_pts_freq );
   END
ELSE
   BEGIN & update_raw OR update_d &
   set_dp_ptrs( ch, 0, 1 & ch_trace_base &);
   set_vars_ptrs_base( 0 );
   ASSEMBLE( MOVE   num_pts_freq, R7;
             MOVE.L dp_scr_array_freq, R13 );
   ary_trace_math;
   END;

IF tdr_mode THEN compute_dc_value;

IF demod > 0 THEN
     do_demod( dp_scr_array_time, num_fpts, demod );

IF compute_gate THEN do_gating;

set_vars_ptrs_base( 0 );                                    &restore&
IF tdr_mode THEN   set_dc_elec_length;
ASSEMBLE( MOVE num_fpts, R7; MOVE.L dp_scr_array_time, R13 );
ary_elec_length;

IF compute_xform  THEN  do_time_domain;
                     & will need to make # pts same for output&
IF tdr_mode THEN
    dp_scr_array_freq := dp_scr_array_freq - 6;

set_vars_ptrs_base( 0 );
ASSEMBLE( MOVE.L dp_scr_array_freq, R13 );
REPEAT num_tpts DO
   BEGIN
   ASSEMBLE( MOVE.L  (R13)+, R0;
             MOVE.W  (R13)+, R1;
             MOVE.L  R13,-(S);
             MOVE.L  dp_format_sw(R12),R10;
             JSR     (R10);
             MOVE.L  (S)+, R13         );
   END;
```

```
            flag := 0;
            release_mem( td_scr_arrays_id );
            END
        ELSE
            warn( exceeded_available_memory );

END ary_datap;
END$
 ASMB,L
    HED fft routines
    NAM fft,7
* UNL
*               WARNING uses all registers ( or most )
R0   REG  0         usually  A mantissa
R1   REG  1         usually  A exp
R2   REG  2         usually  B mantissa
R3   REG  3         usually  B exp
R4   REG  4         scratch  ( was used in fst_trig )
ang  REG  5         angle value
R6   REG  6         Inner loop counter    master value in  2(S)
R7   REG  7         Outer loop counter    master value in  8(S)
R8   REG  8
R10  REG 10         scratch ( was used in fst_trig )
aptr REG  9         ptr to   A (first ) data value
bptr REG  8         ptr to   B (second) data value
R11  REG 11         scratch
dang REG 12         angle delta
R13  REG 13         temp
S    REG 15
*               STACK
*          0    seperation between A,B data in outer loop ( bytes )
*          2    seperation between A,B data in outer loop(data pts)
*          4    Intial data array address   -- 32 bit
*          8    Inner loop counter
*         10    Intial sin_cos array address -- 32 bit
*
* Uses the In-place decimation in freq with natural order twiddles.
*   see BRIGHAM (1974) fig 11-4c or OPPEHHEIM/SCHAFFER (1975) fig 6.15
* An outer loop starts at 1 increasing to 1/2 FFT size, with
*     an inner loop starting at 1/2 FFT size decresing to 1
* Basic buuterfly is  A,B inputs
*                     A+B, (A-B)*W  outputs      ( W is the twiddle )
*
 ENT fft
 ENT ifft
 EXT fst_trig
 EXT fft_size
 EXT ADDE
 EXT SBRE
 EXT MPYE
 EXT preempt
 EXT trig_tbl       & look up tables &
 *EJECT                                     these set the FFT size
 cpxsz    EQU 6
 ifft MOVE  =H0800, R3    positive angle delta
      BRA   ffts
 fft  MOVE  =HF800, R3    negative angle delta
 ffts EQU *
      CLR.L        -(S)             CLEAR INIT ANGLE
      MOVE.W #1,   -(S)             OUTER LOOP INIT VALUE
      MOVE.L R0,   -(S)             ADR OF DATA ARRAY
      MOVE fft_size, R1
      SUBQ  #1,    R1
      ASR   R1,    R3               scale angle increment
      MOVE.W R3,   dang
      MOVE.W #1,   R2
      ASL.W R1,    R2               compute fft size/2
      MOVE.W R2,   -(S)             INNER LOOP INIT VALUE
      MPY   =D6,   R2
      MOVE.W R2,   -(S)             DATA ADRDELTA
 *
 *EJECT      start new inner/outer loop pass
 *
 FFT0 MOVE.L 4(S),  aptr            INIT LOWER ADRPTR
      MOVE.L aptr,  bptr
      ADDA.W (S),   bptr            INIT UPPER ADRPTR
      MOVE.W 8(S),  R7      INIT OUTER LOOP   progress from 1 to 1/2 size
```

```
*
*       outer loop
*
FFT01:  MOVE.L  10(S), ang      INIT ANGLE
        MOVE.W  2(S),  R6       INIT INNER LOOP CTR  progress 1/2 size to 1
*
        MOVE.L  (aptr), R0      read A
        MOVE.W  4(aptr), R1
        MOVE.L  (bptr), R2      read B
        MOVE.W  4(bptr), R3
*
        SUB.B   R1, R3
        BGT     algna1
        BEQ     algnd1
algnb1  EQU *                   R1 (A) > R3 (B)
        NEG.B   R3
        CMP.B   #16, R3
        BLT     algnb10
        CLR.L   R2
        BRA     algnd1
algnb10 EQU *
        ASR.W   R3, R2          align B
        SWAP    R2
        ASR.W   R3, R2
        SWAP    R2
        BRA     algnd1
algna1  EQU *                   align A
        ADD.B   R3, R1          make R1 the larger exponent
        CMP.B   #16, R3
        BLT     algna10
        CLR.L   R0
        BRA     algnd1
algna10 EQU *
        ASR.W   R3, R0
        SWAP    R0
        ASR.W   R3, R0
        SWAP    R0
algnd1  EQU *                   alignments done
        MOVE.L  R0, R3          save a copy of A
*
        ADD.W   R2, R0          add Br to Ar
        BVS     rpovfl
        SUB.W   R2, R3          sub Br from Ar
        BVS     rmovfl
        SWAP    R2
        SWAP    R3
        SWAP    R0
        ADD.W   R2, R0          add Bi to Ai
        BVS     ipovfl
        SUB.W   R2, R3          sub Bi from Ai
        BVS     imovfl
adddone1 EQU *
        SWAP    R3
        SWAP    R0
store1  EQU *
        MOVE.L  R0, (aptr)+     store A + B
        MOVE.W  R1, (aptr)+
        MOVE.L  R3, (bptr)+     store A - B
        MOVE.W  R1, (bptr)+
*
        SUB.W   #1, R6          DECR INNER LOOP   if zero finished with inner
        BGT     FFT6                              if postive do more inner
*
*               finished with inner loop
*
        ADDQ.L  #cpxsz, aptr                      inc A (first) data ptr
        ADDQ.L  #cpxsz, bptr                      inc B (second) data ptr
        SUB.W   #1,    R7       DECR OUTER LOOP
        BGT     FFT01
*
*               finished with outer loop and inner loop=1 therefore done!
*
        ADDA.W  #14, S
        RTS
*
rpovfl  EQU *
        ASR.W   #1, R0
```

```
        EORI =H8000, R0          correct sum
        SUB.W  R2, R3            sub Br from Ar
        ASR.W  #1, R3            overflow not possible
rovf1   EQU *
        SWAP   R2
        SWAP   R3
        SWAP   R0
        ASR.W  #1, R0
        ASR.W  #1, R2
        ASR.W  #1, R3
        ADD.W  R2, R0
        SUB.W  R2, R3
        ADD.B  #1, R1
        BVC adddone1
        MOVE.W =H7F, R1          exponent overflow
        BRA adddone1
*
rmovf1 EQU *
        ASR.W  #1, R3
        EORI =H8000, R3          correct subtraction
        ASR.W  #1, R0
        BRA  rovf1
*
ipovf1 EQU *
        ASR.W  #1, R0
        EORI =H8000, R0          correct sum
        SUB.W  R2, R3
        ASR.W  #1, R3            overflow not possible
iovf1   EQU *
        SWAP R0
        SWAP R3
        ASR.W  #1, R0
        ASR.W  #1, R3
        ADD.B  #1, R1
        BVC store1
        MOVE.W =H7F, R1
        BRA store1
*
imovf1 EQU *
        ASR.W  #1, R3
        EORI =H8000, R3          correct subtraction
        ASR.W  #1, R0
        BRA iovf1
*
rpovf2 EQU *
        ASR.W  #1, R0
        EORI =H8000, R0          correct sum
        SUB.W  R2, R3            sub Br from Ar
        ASR.W  #1, R3            overflow not possible
rovf2   EQU *
        SWAP   R2
        SWAP   R3
        SWAP   R0
        ASR.W  #1, R2
        ASR.W  #1, R3
        ASR.W  #1, R0
        ADD.W  R2, R0
        SUB.W  R2, R3
        ADD.B  #1, R1
        BVC adddone2
        MOVE.W =H7F, R1          exponent overflow
        BRA adddone2
*
rmovf2 EQU *
        ASR.W  #1, R3
        EORI =H8000, R3          correct subtraction
        ASR.W  #1, R0
        BRA  rovf2
*
ipovf2 EQU *
        ASR.W  #1, R0
        EORI =H8000, R0          corect sum
        SUB.W  R2, R3
        ASR.W  #1, R3
iovf2   EQU *
        SWAP R0
        SWAP R3
```

```
        ASR.W    #1, R0
        ASR.W    #1, R3
        ADD.B    #1, R1
        BVC      store2
        MOVE.W   =H7F, R1
        BRA      store2
*
imovf2  EQU *
        ASR.W    #1, R3
        EORI     =H8000, R3
        ASR.W    #1, R0
        BRA      iovf2
*
*EJECT  inner loop  enter
*
FFT6    EQU *
        MOVE.L   (aptr), R0       read A
        MOVE.W   4(aptr), R1
        MOVE.L   (bptr), R2       read B
        MOVE.W   4(bptr), R3
*
        SUB.B    R1, R3
        BGT      algna2
        BEQ      algnd2
algnb2  EQU *                     R1 (A) > R3 (B)
        NEG.B    R3
        CMP.B    #16, R3
        BLT      algnb20
        CLR.L    R2
        BRA      algnd2
algnb20 EQU *
        ASR.W    R3, R2           align B
        SWAP     R2
        ASR.W    R3, R2
        SWAP     R2
        BRA      algnd2
algna2  EQU *                     align A
        ADD.B    R3, R1           make R1 the larger exponent
        CMP.B    #16, R3
        BLT      algna20
        CLR.L R0
        BRA      algnd2
algna20 EQU *
        ASR.W    R3, R0
        SWAP     R0
        ASR.W    R3, R0
        SWAP     R0
algnd2  EQU *                     alignments done
        MOVE.L   R0, R3           save a copy of A
*
        ADD.W    R2, R0           add Br to Ar
        BVS      rpovf2
        SUB.W    R2, R3           sub Br from Ar
        BVS      rmovf2
        SWAP     R2
        SWAP     R3
        SWAP     R0
        ADD.W    R2, R0           add Bi to Ai
        BVS      ipovf2
        SUB.W    R2, R3           sub Bi from Ai
        BVS      imovf2
adddone2 EQU *
        SWAP     R3
        SWAP     R0
store2  EQU *
        MOVE.L   R0, (aptr)+      store A + B
        MOVE.W   R1, (aptr)+
*
        ADD      dang, ang        increment angle
        MOVE     ang, R4
        AND      =H3FE, R4
        BNE      fft61
*
        BTST #10, ang              mpy by w(0) or w(90)
        BEQ      fft59
        SWAP     R3                mpy by w(90)
        NEG      R3
```

```
        BVC     fft59
        MOVE    =H7FFF, R3          +1 overflow
fft59 EQU *
        BTST    #11, ang
        BEQ     fft66
        NEG     R3
        BVC     fft591
        MOVE    =H7FFF, R3
fft591 EQU *
        SWAP    R3
        NEG     R3
        BVC     fft592
        MOVE    =H7FFF, R3
fft592 EQU *
        SWAP    R3
        BRA     fft66
*
fft61 EQU *
        LEA     trig_tbl.L, R10
        MOVE    0(R10,R4.W), R2     sin
        BGE     fft62
        MOVE    =H7FFF, R2          +1 substitute
fft62 EQU *
        NEG     R4
        AND     =H3FE, R4
        MOVE    0(R10,R4.W), R0     cos
        BGE     fft621
        MOVE    =H7FFF, R0          +1 substitute
fft621 EQU *
        BTST    #10, ang
        BEQ     fft63
        NEG     R2                  90 - 180
        EXG     R2, R0
fft63 EQU *
        BTST    #11, ang
        BEQ     fft64
        NEG     R2                  180 - 360
        NEG     R0
fft64 EQU *
        MOVE.L  R3, R4              duplicate ( A-B)
        MPY     R0, R3              real*cos
        MOVE.L  R3, R11             temp save
        SWAP    R4
        MPY     R4, R0              imag*cos
        MOVE    R4, R3
        MPY     R2, R3              imag*sin
        SWAP    R4
        MPY     R4, R2              real*sin
        ADD.L   R2, R0              imag part
        SUB.L   R3, R11             real part
        MOVE.L  R11, R3
        ADD.L   R0, R0              normalize a maximum of one time
        BVS     mpyovfi
        ADD.L   R3, R3
        BVS     mpyovfr
mpydone EQU *
        SWAP    R3
        MOVE    R3, R0
        MOVE.L  R0, R3
*
fft66 EQU *
        MOVE.L  R3, (bptr)+         STORE (A - B)*W
        MOVE.W  R1, (bptr)+
*
        SUB.W   #1, R6              DECR INNER LOOP
        BGT     FFT6                loop back if more
        SUB.W   #1, R7              DECR OUTER LOOP
        BLE     FFT9                   or both inner and outer loop finished?
        MOVE.L  bptr, aptr          INIT ADR PTRS -- more to do on outer
        ADDA.W  (S), bptr
        BRA     FFT01
*
* inner loop and outer loop finished __ set up new loop conditions
*
FFT9 LSL.W 8(S)                     OUTER LOOP DOUBLED
        ASR.W   2(S)                INNER LOOP HALVED
        ASR.W   (S)                 ADR DELTA HALVED
```

```
        ADD     dang, dang              ANGLE DELTA DOUBLED
*       MOVE    dang, -(S)
*       JSR     preempt.L
*       MOVE    (S)+, dang
        BRA     FFT0
*
mpyovfi EQU *
        ASR.L   #1, R0
        BCHG    #31, R0
        BRA     mpyovf
mpyovfr EQU *
        ASR.L   #1, R3
        BCHG    #31, R3
        ASR.L   #1, R0
mpyovf EQU *
        ADDQ.B  #1, R1
        BVC     mpydone
        MOVEQ   =H7F, R1                exponent overflow
        BRA     mpydone
*
*
*
*
*EJECT          unpack bit-reversing routine see Rabiner/Gold(1975) p365
        ENT     fftun                   or Oppenheim/Schafer(1975) p316
fftun EQU *
        MOVE.L  R0,         R10         R10 has start adr for data array
        MOVE.W  fft_size,   R3
        LEA     bit_test,   R13
        MPY     =D-6,       R3          scale fft size by branch increments
        LEA     72(R13,R3.W), R13       branch point into bit reverse counter
        MOVE.L  R10,        bptr        bptr has destination adr for data array
        MOVE.L  R10,        aptr        aptr has source adr for data array
        CLR.W   R0                      R0 will be item index
*
loop EQU *
        CMP.L   aptr,       bptr
        BGT     swap
        ADDQ.L  #cpxsz, aptr
        JMP     (R13)
*
swap EQU *
        MOVE.L  (aptr),     R1
        MOVE.L  (bptr),     (aptr)+
        MOVE.L  R1,         (bptr)+
        MOVE.W  (aptr),     R1
        MOVE.W  (bptr),     (aptr)+
        MOVE.W  R1,         (bptr)+
        JMP     (R13)
*
bit_test EQU *
        BCHG    #12, R0
        BEQ     bit_rev                 Note: R0 is actually 2*index
        BCHG    #11, R0                 Note: The above branch size calculation relies
        BEQ     bit_rev                       on these being 6 bytes each
        BCHG    #10, R0
        BEQ     bit_rev
        BCHG    #9,  R0
        BEQ     bit_rev
        BCHG    #8,  R0
        BEQ     bit_rev
        BCHG    #7,  R0
        BEQ     bit_rev
        BCHG    #6,  R0
        BEQ     bit_rev
        BCHG    #5,  R0
        BEQ     bit_rev
        BCHG    #4,  R0
        BEQ     bit_rev
        BCHG    #3,  R0
        BEQ     bit_rev
        BCHG    #2,  R0
        BEQ     bit_rev
        BCHG    #1,  R0
        BEQ     bit_rev
        JSR     preempt.L               release the processor for higher priotority use
        RTS
*
```

```
bit_rev MOVE.W  R0, R1
   ADD.W   R1, R1
   ADD.W   R0, R1              mpy by 3 to get byte index
   LEA     0(R10,R1.W), bptr
   BRA     loop
*
   END & print the auxiliary sizing -- may be blank &
& active_title does some special formatting itself &
IF (act_fcn <> active_title)         AND
   (( act_fcn < active_std_label ) OR
    ( act_fcn > active_reg_label ))
      THEN    & not a title or label function &
   BEGIN & if &
100   {IF units = 6 AND NOT rpg_marker THEN
         BEGIN & if &          & seconds -- add distance readout &
            active_fcn_real := REAL(act_fcn_val  -
                                    adj_if_delta_mkr )
101                * speed_of_light
                   * e_ch_real( ch_velocity_factor );
            active_fcn_real := active_fcn_real*unscale_multiplier;
            param := get_param( curr_e_ch );
            IF param = 0 &s11& OR param = 3 &s22& OR
               param = o1_parm OR param = o2_parm THEN
               BEGIN
102            active_fcn_real := active_fcn_real / 2.; &reflect&
               dist_suf := distance_refl_suffix;
               END
            ELSE
               dist_suf := distance_suffix;
            IF active_fcn_real < 1.0 THEN
               dist_fmt := distance_format
103         ELSE IF active_fcn_real < 1.0e3 THEN
               dist_fmt := dist_m_format
            ELSE
               dist_fmt := dist_km_format;
            app_str( fmt_real( active_fcn_real,
                               e_aux,
104                            fmt_tbl[ distance_format ]
                             ),
                     suffix[ dist_suf ] );
         END; & if &
200
*
* group delay
*
delay EQU *
   BSR        arctan
   MOVE.L     dp_grp_dly_mem(R12),R1
   MOVE.L     R0,dp_grp_dly_mem(R12)
   SUB.L      R0,             R1           delta phi
   BEQ        del11
   ADD.L      =H20000,        R1           sign extend
   AND.L      =H3FFFF,        R1
   SUB.L      =H20000,        R1
   MOVE.L     #14,            R0
   ASL.L      R0,             R1
   MOVE.B     #3,             R0           CNV32  *
del1 EQU *                                        *
   SUB.B      #1,             R0                  *
   ASL.L      #1,             R1                  *
   BVC        del1                                *
   ROXR.L     #1,             R1                  *
   MOVE.B     R0,             R1                  *
   TST        l_mode
   BEQ        del11
```

```
* group delay for list mode
 MOVE.L      R1,-(S)
 MOVE.W      dp_pos(R12), R0
 SUBQ.W      #1, R0
 ADD.W       R0, R0
 ADD.W       R0, R0
 ADD.W       R0,R0
 MOVE.L      f_list, R10
 ADD.W       R0, R10
 MOVE.L      (R10)+, R2
 MOVE.L      (R10)+, R3
 MOVE.L      (R10)+, R0
 MOVE.L      (R10), R1
 SUB.L       R3,R1
 SUBX.L      R2,R0
 JSR         CNVA2
 MOVE.L      (S)+, R1
 JSR         DVR2
 MOVE.L      R0,R1
del11 EQU *
 MOVE.L      R1,R0
*scaling for frequency increment is done during display scaling and
* during channel marker calculation (see 'cntr_dat_prc' and
* 'ch_mkr_val' in SDATAP)
 MOVE.W      #1, R1
 CMP.W       dp_pos(R12), R1           check if 1st, 2nd,or rest of pts
 BLT         smoothing                 not 1st or 2nd
 BGT         del2
 CLR.W       dp_pos(R12)               reset dp_pos
 MOVE.L      R0,-(S)                 · save 2 pt for later
 BSR         smoothing                 place 2nd pt in first pt
 MOVE.L      (S)+, R0
 BRA         smoothing                 now do 2 pt
del2 EQU *
 MOVE.W      R1,         dp_pos(R12)   1st pt inc first pos   for test
 RTS                                   exit skiping first point
*EJECT
```

```
PROCEDURE auto_delay;
   BEGIN
   INTEGER ch,
           format,
           dm,
           list_sweep,
           update_block,
           smoo_on,
           index;
   COMPLEX value;
   REAL    value_1 = value,
           smoo_aper;

IF curr_e_ch = 1 THEN
   jmp(jump_channel1, end_ch1_position)
ELSE
   jmp(jump_channel2, end_ch2_position);

ch := curr_e_ch;
IF (get_dom( ch ) = 0) AND (e_ch_quad( ch_frequency_span )>10 ) THEN
   BEGIN
   format := e_ch_bitmap( Cmag );
   list_sweep := e_ch_bit(Clist_freq) OR e_ch_bit(Clog_freq);
   IF e_ch_bit( Cmem ) OR
      (e_ch_bit( Cdisp_math ) AND e_ch_bit( Cmore_math )) THEN
      BEGIN
      dm := 0;
      update_block := update_m;
      END
   ELSE
      BEGIN
```

```
            dm := 1;
            update_block := update_d;
            END;
         smoo_on := ch_dm_bit( Csmoothing, curr_e_ch, dm );
         smoo_aper := e_ch_real( ch_smoothing_aperture );
         acquire( processing_variables );
         h_key( Cdelay, Cmag, Cswr );
         IF NOT smoo_on THEN h_set( 1, Csmoothing );
         IF NOT smoo_on THEN
            BEGIN
            h_set( 1, Csmoothing );
            ch_mbit( Csmoothing );
            END;
         set_e_ch_real( 20., ch_smoothing_aperture );
         index := get_param_index( ch );
         elec_delay[ index, ch ] := 0.;
301      cont_datap( ch );
         IF list_sweep THEN upd_el_del_list(ch);
         upd_datap( ch, update_block );
302      value := mkr_val( ch , 0 );
303      elec_delay[ index, ch ] := value_1;
         h_key( Cmag+format, Cmag, Cswr );
         IF NOT smoo_on THEN
            BEGIN
            h_set( 0, Csmoothing );
            ch_mbit( Csmoothing );
            END;
         set_e_ch_real( smoo_aper, ch_smoothing_aperture );
         cont_datap( ch );
304
         IF list_sweep THEN upd_el_del_list(ch);
         upd_datap( ch, update_block );
         release( processing_variables );
         partial( update_d );
         select_act_fcn( active_previous );
         END
         ELSE
         warn( source_doesnt );

IF curr_e_ch = 1 THEN
            unjmp(jump_channel1, end_ch1_position)
         ELSE
            unjmp(jump_channel2, end_ch2_position);

END auto_delay;
```

The foregoing description is offered primarily for purposes of illustration. It will be readily apparent to those skilled in the art that numerous modifications and variations not mentioned above can still be made without departing from the spirit and scope of the invention as claimed below.

What is claimed is:

1. A method for measuring optical reflections, which allows resolution of one or more optical reflections due to one or more corresponding discontinuities in an optical device under test, comprising the steps of:
producing a continuous wave optical signal;
producing at least one modulating signal;
modulating the continuous wave optical signal with the at least one modulating signal to produce at least one modulated optical signal;
applying the at least one modulated optical signal to the optical device under test;
thereby producing incident and reflected modulated optical signals in the optical device under test, the reflected modulated optical signal being produced by the at least one modulated optical signal being reflected as the modulated optical signal encounters a change in the index of refraction caused by a discontinuity in the optical device under test;
detecting a phase value of an envelope of the incident modulated optical signal and a phase value of an envelope of the reflected modulated optical signal;
comparing the values of the phase envelopes of the incident and reflected modulated optical signals to determine an envelope phase difference;
calculating a propagation delay difference between the incident and reflected modulated optical signals from the envelope phase difference and the speed of light according to the expression $X = (vel/2) \cdot \Delta Phi_e / w_m$, where x is the distance to a discontinuity in the optical device under test, vel is the propagation velocity of the continuous wave in the optical device under test, $DeltaPhi_e$ is the envelope phase difference, and $w_m$ is the at least one modulating frequency.

2. The method of claim 1 wherein a reflection is located to within millimeters of its actual location.

3. The method of claim 1 wherein the device under test is an optical transmission medium.

4. The method of claim 3 wherein the optical transmission medium is an optical fiber cable.

5. The method of claim 4, further comprising the step of measuring optical fiber cable length.

6. The method of claim 5 wherein the step of measuring optical fiber cable length comprises the steps of:
   detecting a ripple with one periodic frequency whose period corresponds to a time delay equal to twice the length of the optical fiber cable as given by the equation $T = 2X*1nsec/30cm$; and
   calculating the length of the optical fiber cable as given by the equation $L_x = (\frac{1}{2})(30cm*T/1nsec)$.

7. A method for measuring optical reflections, which allows resolution of reflections due to corresponding discontinuities in an optical device under test, comprising the steps of:
   producing a continuous wave optical signal;
   producing a first modulating signal;
   modulating the continuous wave optical signal with the first modulating signal to produce a first modulated optical signal;
   apply the first modulated optical signal to the optical device under test at a first time;
   producing at least a second modulating signal;
   modulating the continuous wave optical signal with the second modulating signal to produce at least a second modulated optical signal;

8. The method of claim 7 wherein multiple discontinuities are resolved to within centimeters of their respective actual locations.

9. The method of claim 8 wherein multiple reflection resolutions are resolved to within 5 cm.
   applying the second modulated optical signal to the optical device under test at a second time;
   thereby producing first and at least second incident and reflected modulated optical signals in the optical device under test, the first and at least second reflected modulated optical signals being produced by the first and second modulated optical signals being reflected as the first and second modulated optical signals encounter at the first and second times a change in the index of refraction caused by a discontinuity in the optical device under test;
   detecting phase values of respective envelopes of the incident modulated optical signal for the first and at least second modulating signals and phase values of respective envelopes of the reflected modulated optical signal for the first and at least second modulating signals at the respective first and second times;
   comparing the respective values of the phase envelopes of the incident and reflected modulated optical signals to determine respective envelope phase differences;
   calculating a propagation delay difference between the respective incident and reflected modulated optical signals from the envelope phase differences according to the expression $X = (vel/2)*[(\text{Delta Phiwm1}/w_{m1}] - (\text{Delta Phiwm2}/w_{m2})$ where x is the distance to a discontinuity in the optical device under test, vel is the propagation velocity of the continuous wave in the optical device under test, Delta Phiwm1 and Delta Phiwm2 are the respective envelope phase differences, and $w_{m1}$ and $w_{m2}$ are the first and at least second modulating frequencies.

10. The method of claim 7 wherein a length of optical fiber cable is measured.

11. The method of claim 7, further comprising the steps of:
    detecting a ripple with one periodic frequency whose period corresponds to a time delay equal to twice the length of the optical transmission medium as given by the equation $T = 2x*1nmsec/30cm$; and
    calculating the length of the optical transmission medium as given by the equation $L_x = (\frac{1}{2})(30cm*T/1nsec)$.

12. The method of claim 11 wherein a length of optical fiber cable is measured.

13. The method of claim 7 wherein a distance to at least one discontinuity is measured.

14. A lightwave component measurement system for measuring optical reflections to locate a discontinuity in, or measure a length of, an optical device under test, comprising:
    a lightwave component analyzer including:
       a modulation source for generating an electrical signal to provide at least one modulating signal; and
       detecting means having at least one input port;
    a lightwave source connected to the modulation source, the lightwave source including an optical source for producing a continuous wave optical signal and modulating means responsive to the electrical signal generated by the modulation source and to the continuous wave optical signal for producing a modulated optical signal;
    a lightwave receiver including an opto-electrical transducer for converting a received optical signal into an electrical signal;
    an optical signal separation device coupled to the lightwave source for feeding a portion of the modulated optical signal to the optical device under test and another portion of the modulated optical signal to the lightwave receiver, thereby producing incident and reflected modulated optical signals, the reflected modulated optical signal being produced by the incident modulated optical signal being reflected as the incident modulated optical signal encounters one of a discontinuity in, and a terminus, of the optical device under test;
    the electrical signal produced by the lightwave receiver being fed to the input port of the detecting means;
    the lightwave component analyzer further including:
       means for detecting a phase value of an envelope of the incident modulated optical signal and a phase value of an envelope of the reflected modulated optical signal;
       means for comparing the values of the phase envelopes of the incident and reflected modulated optical signals to determine an envelope phase difference; and
       means for calculating a propagation delay difference between the incident and reflected modulated optical signals from the envelope phase difference and the speed of light according to the expression $x = (vel/2)*\text{Delta Phi}_e/w_m$, where x is the distance to the one of the discontinuity in, and the terminus of, the optical device under test, vel is the propagation velocity of the continuous wave in the optical device under test, Delta Phi$_e$ is the envelope phase difference, and $w_m$ is the frequency of the electrical signal generated by the modulation source;

whereby the location of the one of the discontinuity and the terminus is revealed by the propagation delay difference.

15. The lightwave component measurement system of claim 14 wherein the modulation source generates a 300 kHz to 3 GHz electrical signal.

16. The lightwave component measurement system of claim 14 wherein the optical signal separation device is one of a coupler and a splitter/combiner.

17. The lightwave component measurement system of claim 14 wherein the detecting means is a tuned vector receiver and the tuned vector receiver has a second input port, further comprising a power splitter connected to the modulation source for feeding a selected portion of the electrical signal generated by the modulation source to the lightwave source and another portion of the electrical signal generated by the modulation source as a reference signal to the second input port of the tuned vector receiver.

18. The lightwave component measurement system of claim 14 wherein the device under test is an optical transmission medium.

19. The lightwave component measurement system of claim 18, further comprising:
  means for detecting a ripple with one periodic frequency whose period corresponds to a time delay equal to twice the length of the optical transmission medium as given by the equation $T = 2X * 1\text{nsec}/30\text{cm}$; and
  means for calculating the length of the optical transmission medium as given by the equation $L_x = (\frac{1}{2})(30\text{cm} * T / 1\text{nsec})$.

20. The lightwave component measurement system of claim 14 having a measurement dynamic range of at least 45 dB.

* * * * *